United States Patent
Irino et al.

(10) Patent No.: US 8,239,565 B2
(45) Date of Patent: Aug. 7, 2012

(54) FLOW RECORD RESTRICTION APPARATUS AND THE METHOD

(75) Inventors: Hitoshi Irino, Musashino (JP); Masaru Katayama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 335 days.

(21) Appl. No.: 12/514,883

(22) PCT Filed: Nov. 20, 2007

(86) PCT No.: PCT/JP2007/072456
§ 371 (c)(1),
(2), (4) Date: May 14, 2009

(87) PCT Pub. No.: WO2008/062787
PCT Pub. Date: May 29, 2009

(65) Prior Publication Data
US 2010/0070647 A1    Mar. 18, 2010

(30) Foreign Application Priority Data

Nov. 21, 2006  (JP) ................................ 2006-314299
Jul. 31, 2007  (JP) ................................ 2007-199499

(51) Int. Cl.
*G06F 15/16*    (2006.01)

(52) U.S. Cl. ........ 709/234; 709/225; 709/227; 709/229; 709/230; 709/231; 709/232; 709/233

(58) Field of Classification Search .................. 709/234, 709/225, 227, 229, 230, 231, 232, 233
See application file for complete search history.

(56) References Cited

U.S. PATENT DOCUMENTS

| | | | | |
|---|---|---|---|---|
| 6,570,875 B1 * | 5/2003 | Hegde | ............................ | 370/389 |
| 6,671,258 B1 * | 12/2003 | Bonneau | ........................ | 370/235 |
| 6,836,466 B1 * | 12/2004 | Kant et al. | ..................... | 370/252 |
| 7,039,013 B2 * | 5/2006 | Ruutu et al. | ................... | 370/235 |
| 7,286,482 B2 * | 10/2007 | Charcranoon | ................ | 370/251 |
| 7,385,924 B1 * | 6/2008 | Riddle | .......................... | 370/235 |
| 7,453,806 B2 * | 11/2008 | Benayoun et al. | ............ | 370/231 |

(Continued)

FOREIGN PATENT DOCUMENTS

JP    2003 244321    8/2003

(Continued)

OTHER PUBLICATIONS

Claise, B., "Cisco Systems Netflow Services Export Version 9", CISCO Systems, pp. 1-33 (2004) RFC3954.

(Continued)

*Primary Examiner* — Yasin Barqadle
*Assistant Examiner* — Van Kim T Nguyen
(74) *Attorney, Agent, or Firm* — Oblon, Spivak, McClelland, Maier & Neustadt, L.L.P.

(57) ABSTRACT

A Flow Record restriction apparatus is provided for restricting a transmission number of Flow Records while maintaining measurement information of the whole traffic. The Flow Record restriction apparatus includes: a flow generation unit 202 configured to determine a set of packets having the same attribute to be a flow of the same communication, and to generate a Flow Record based on header information of the packets for each flow; a Flow Record number restriction function unit 203 including a management buffer for temporarily storing generated Flow Records, and being configured to read the Flow Records from the management buffer and output the Flow Records; and a Flow Record transmission unit 204 configured to packetize the output Flow Records to transmit packets over the measurement network, wherein, when a number of Flow Records stored in the management buffer exceeds a preset upper limit value, the Flow Record number restriction function unit 203 aggregates a part of stored Flow Records.

10 Claims, 20 Drawing Sheets

U.S. PATENT DOCUMENTS

| | | | |
|---|---|---|---|
| 7,466,703 B1 * | 12/2008 | Arunachalam et al. | 370/392 |
| 7,515,591 B1 * | 4/2009 | Burch et al. | 370/395.1 |
| 7,738,375 B1 * | 6/2010 | Vinokour et al. | 370/232 |
| 2002/0032717 A1 | 3/2002 | Malan et al. | |
| 2004/0151117 A1 * | 8/2004 | Charcranoon | 370/235 |
| 2007/0140282 A1 * | 6/2007 | Lakshmanamurthy et al. | 370/412 |

FOREIGN PATENT DOCUMENTS

| | | |
|---|---|---|
| JP | 2005 210756 | 8/2005 |
| JP | 2006 50442 | 2/2006 |
| WO | WO 02/13486 A2 | 2/2002 |
| WO | WO 02/13486 A3 | 2/2002 |

OTHER PUBLICATIONS

Estan, C. et al., "Building A Better NetFlow", ACM SIGCOMM Computer Communication Review, 34, Issue 4, pp. 245-246 (2004).

Claise, B., "IPFIX Protocol Specification", Internet Draft, pp. 1-64 (2006).

B. Claise, Specification of the IPFIX Protocol for the Exchange of IP Traffic Flow Information, Internet Draft, Nov. 2006, vol. IPFIX, No. 24 pp. 1-64.

* cited by examiner

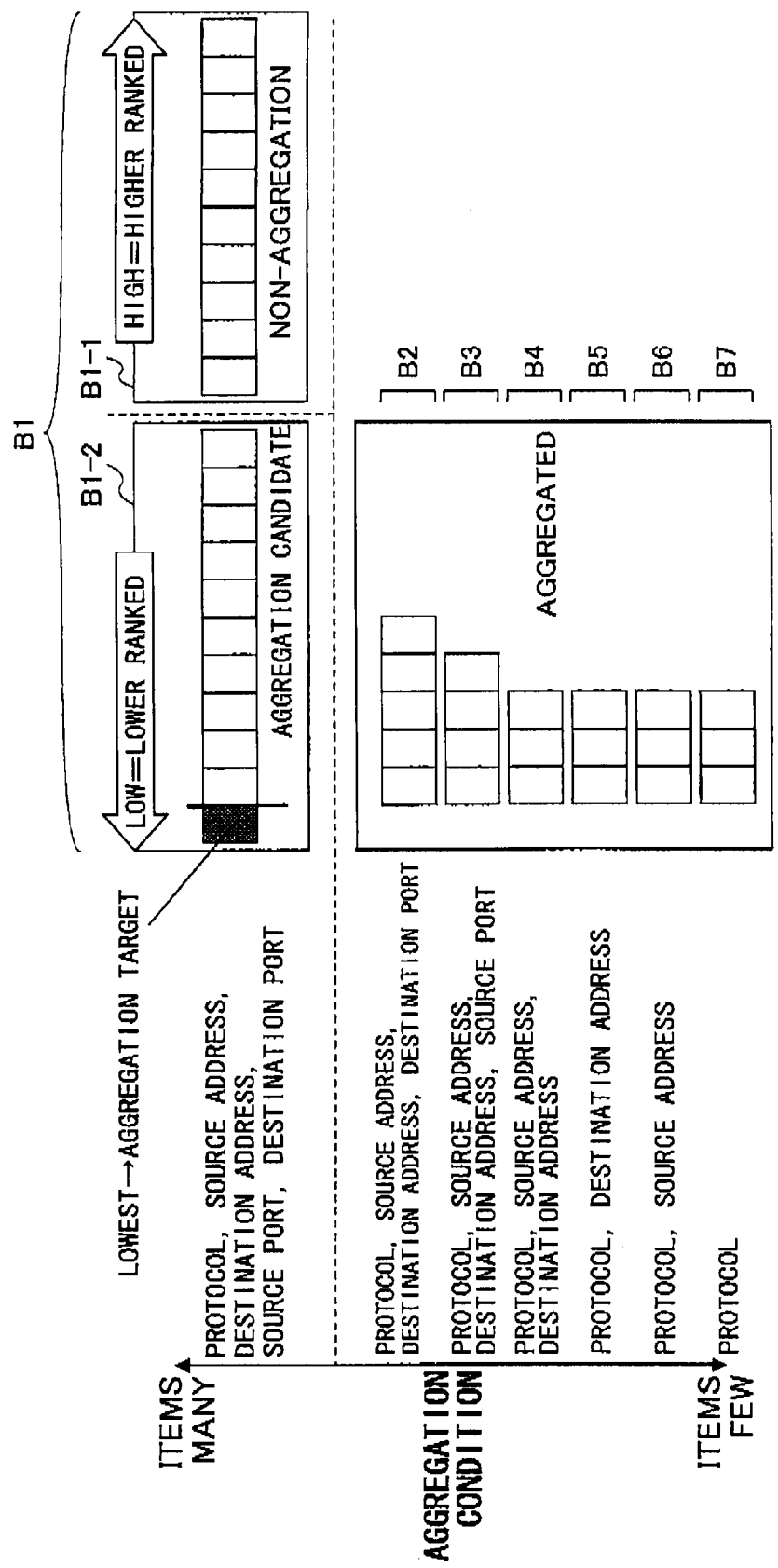

FIG.4

- DATA STRUCTURE DEFINITION INFORMATION

| Set ID = 2 | Length = 56 | |
|---|---|---|
| Template ID = 256 | Field Count = 12 | |
| 8(sourceIPv4Address) | 4 | |
| 12(destinationIPv4Address) | 4 | |
| 9(sourceIPv4PrefixLength) | 1 | |
| 13(destinationIPv4PrefixLength) | 1 | |
| 5(ipClassOfService) | 1 | |
| 4(protocolIdentifier) | 1 | |
| 7(sourceTransportPort) | 2 | |
| 11(destinationTransportPort) | 2 | |
| 2(packetDeltaCount) | 8 | |
| 1(octetDeltaCount) | 8 | |
| 22(flowStartSysUpTime) | 4 | |
| 21(flowEndSysUpTime) | 4 | |

- FLOW RECORD

| Set ID = 256 | | Length = 44 | |
|---|---|---|---|
| sourceIPv4Address (EXAMPLE : 192.168.0.1) | | | |
| destinationIPv4Address (EXAMPLE : 192.168.0.2) | | | |
| sourceIPv4 PrefixLength | destinationIPv4 PrefixLength | ipClass OfService | protocol Identifier |
| sourceTransPort | | destinationTransPort | |
| packetDeltaCount | | | |
| octetDeltaCount | | | |
| flowStartSysUpTime | | | |
| flowEndSysUpTime | | | |

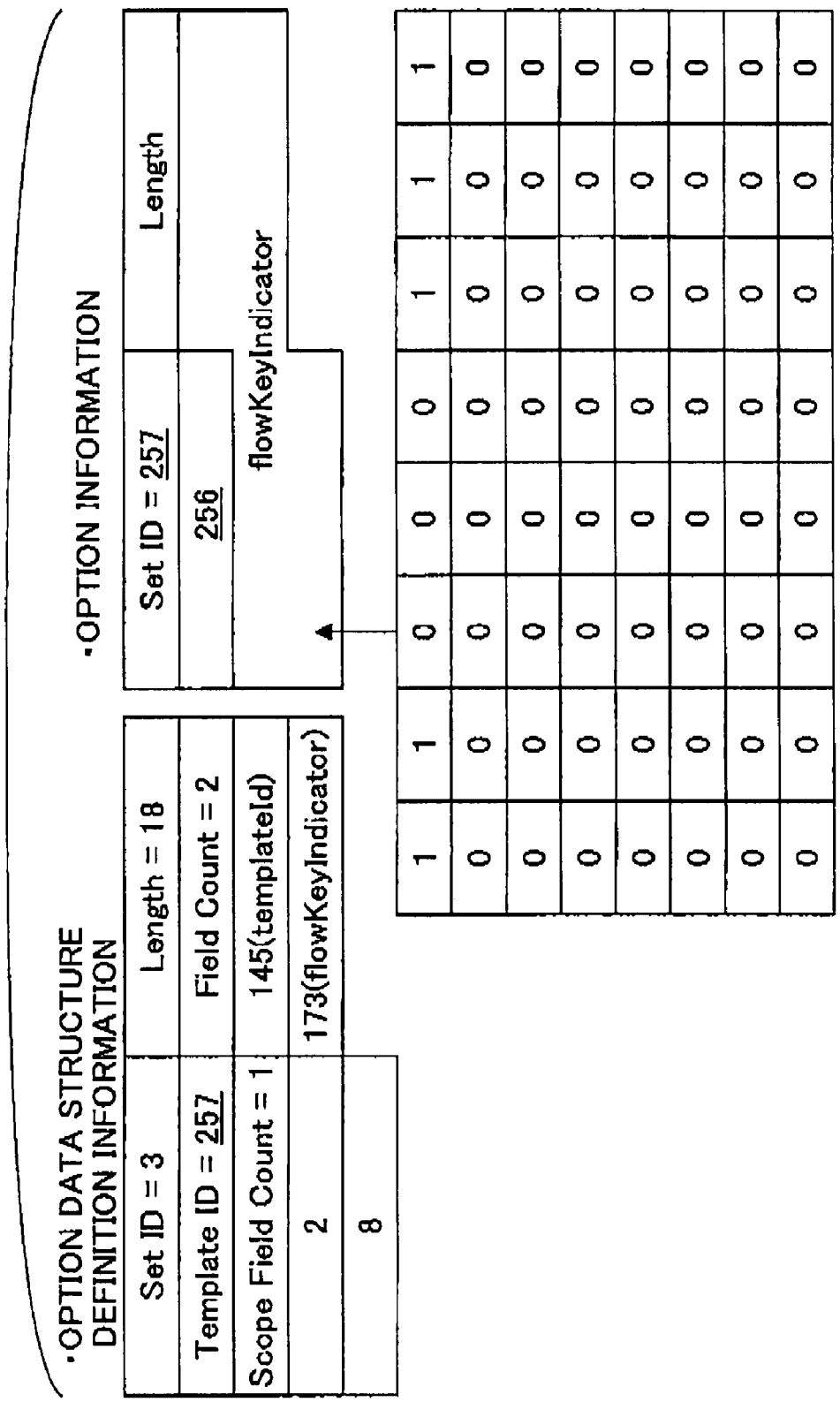

FIG.6

SET DEFINITION INFORMATION

| ITEM ID | SIZE | CONDITION PRIORITY |
|---|---|---|
| 8(sourceIPv4Address) | 4 | 3 |
| 12(destinationIPv4Address) | 4 | 2 |
| 9(sourceIPv4PrefixLength) | 1 | |
| 13(destinationIPv4PrefixLength) | 1 | |
| 5(ipClassOfService) | 1 | |
| 4(protocolIdentifier) | 1 | 1 |
| 7(sourceTransportPort) | 2 | 5 |
| 11(destinationTransportPort) | 2 | 4 |
| 2(packetDeltaCount) | 8 | |
| 1(octetDeltaCount) | 8 | |
| 22(flowStartSysUpTime) | 4 | |
| 21(flowEndSysUpTime) | 4 | |

CONDITIONS TO BE DEVELOPED AND USED

| ITEM ID (NUMBER OF DELETIONS 0) |
|---|
| 8(sourceIPv4Address) |
| 12(destinationIPv4Address) |
| 4(protocolIdentifier) |
| 7(sourceTransportPort) |
| 11(destinationTransportPort) |

| ITEM ID (NUMBER OF DELETIONS 1) |
|---|
| 8(sourceIPv4Address) |
| 12(destinationIPv4Address) |
| 4(protocolIdentifier) |
| 11(destinationTransportPort) |

| ITEM ID (NUMBER OF DELETIONS 2) |
|---|
| 8(sourceIPv4Address) |
| 12(destinationIPv4Address) |
| 4(protocolIdentifier) |

| ITEM ID (NUMBER OF DELETIONS 3) |
|---|
| 12(destinationIPv4Address) |
| 4(protocolIdentifier) |

| ITEM ID (NUMBER OF DELETIONS 4) |
|---|
| 4(protocolIdentifier) |

FIG.7

SET DEFINITION INFORMATION

| ITEM ID | SIZE | CONDITION PRIORITY |
|---|---|---|
| 8(sourceIPv4Address) | 4 | 2 |
| 12(destinationIPv4Address) | 4 | 2 |
| 9(sourceIPv4PrefixLength) | 1 | |
| 13(destinationIPv4PrefixLength) | 1 | |
| 5(ipClassOfService) | 1 | |
| 4(protocolIdentifier) | 1 | 1 |
| 7(sourceTransportPort) | 2 | 4 |
| 11(destinationTransportPort) | 2 | 4 |
| 2(packetDeltaCount) | 8 | |
| 1(octetDeltaCount) | 8 | |
| 22(flowStartSysUpTime) | 4 | |
| 21(flowEndSysUpTime) | 4 | |

CONDITIONS TO BE DEVELOPED AND USED

ITEM ID (NUMBER OF DELETIONS 0)
- 8(sourceIPv4Address)
- 12(destinationIPv4Address)
- 4(protocolIdentifier)
- 7(sourceTransportPort)
- 11(destinationTransportPort)

ITEM ID (NUMBER OF DELETIONS 1)
- 8(sourceIPv4Address)
- 12(destinationIPv4Address)
- 4(protocolIdentifier)
- 11(destinationTransportPort)

ITEM ID (NUMBER OF DELETIONS 1)
- 8(sourceIPv4Address)
- 12(destinationIPv4Address)
- 4(protocolIdentifier)
- 7(sourceTransportPort)

ITEM ID (NUMBER OF DELETIONS 2)
- 8(sourceIPv4Address)
- 12(destinationIPv4Address)
- 4(protocolIdentifier)

ITEM ID (NUMBER OF DELETIONS 3)
- 12(destinationIPv4Address)
- 4(protocolIdentifier)

ITEM ID (NUMBER OF DELETIONS 3)
- 8(sourceIPv4Address)
- 4(protocolIdentifier)

ITEM ID (NUMBER OF DELETIONS 4)
- 4(protocolIdentifier)

```
<meteringProcess id="1">
    <flowMetering>
        <rule>
            <templateId>256</templateId>
            <flowIKey>
              <fieldName>sourceIPv4Address</fieldName>
              <flowKeyPrecedence>3</flowKeyPrecedence>
            </flowKey>
            <flowIKey>
              <fieldName>destinationIPv4Address</fieldName>
              <flowkeyPrecedence>2</flowKeyprecedence>
            </flowKey>
            <nonFlowKey>
              <fieldName>sourceIPv4Prefix</fieldName>
            </nonFlowKey>
            <nonFlowKey>
              <fieldName>destinationIPv4Prefix</fieldName>
            </nonFlowKey>
            <nonFlowKey>
              <fieldName>ipClassOfService</fieldName>
            </nonFlowKey>
            <flowKey>
              <fiedName>protocolIdentifier</fieldName>
              <flowKeyPrecedence>1</flowKeyPrecedence>
            </flowKey>
            <flowKey>
              <fieldName>sourceTransportPort</fieldName>
              <flowKeyPrecedence>5</flowKeyPrecedence>
            </flowKey>
            <flowKey>
              <fieldName>destinationTransportPort</fieldName>
              <flowkeyPrecedence>4</flowKeyPrecedence>
            </flowKey>
            <nonFlowKey>
              <fieldName>packetDeltaCount</fieldName>
              <fieldLength>8</fieldLength>
            </nonFlowKey>
            <nonFlowkey>
              <fieldName>octetDeltaCount</fieldName>
              <fieldLength>8</fieldLength>
            </nonFlowKey>
            <nonFlowkey>
              <fieldName>flowStartSeconds</fieldName>
            </nonFlowKey>
            <nonFlowkey>
              <fieldName>flowEndSeconds</fieldName>
            </nonFlowKey>
        </rule>
    </flowMetering>
    <next>
        <exportingProcessId>1</exportingProcessId>
    </next>
</meteringProcess>
```

| | A | B | C | D | E |
|---|---|---|---|---|---|
| protocolIdentifier | 6 | 6 | 17 | 17 | 1 |
| destinationIPv4Address | 192.168.0.1 | 192.168.0.1 | 192.168.0.1 | 10.0.0.1 | 192.168.0.1 |
| sourceIPv4Address | 10.0.0.1 | 10.0.0.2 | 10.0.0.1 | 192.168.0.1 | 10.0.0.1 |
| destinationTransportPort | 80 | 80 | 443 | 56789 | 0 |
| sourceTransportPort | 23456 | 34567 | 45678 | 8000 | 0 |

FIG.17

| HISTORY NUMBER | | 1 | 2 | 3 | 4 | 5 |
|---|---|---|---|---|---|---|
| NUMBER OF AGGREGATION TARGETS | – | 120034 | 25021 | 93898 | 40000 | 108270 |
| NUMBER OF AGGREGATION RESULTS | – | 20000 | 20000 | 20000 | 20000 | 20000 |
| protocolIdentifier | 1 | 4 | 0 | 4 | 4 | 4 |
| destinationIPv4Address | 2 | 6442 | 23 | 5656 | 278 | 7131 |
| sourceIPv4Address | 3 | 12321 | 1111 | 11223 | 879 | 10342 |
| destinationTransportPort | 4 | 1233 | 8765 | 3117 | 7728 | 2523 |
| sourceTransportPort | 5 | 0 | 10101 | 0 | 11111 | 0 |

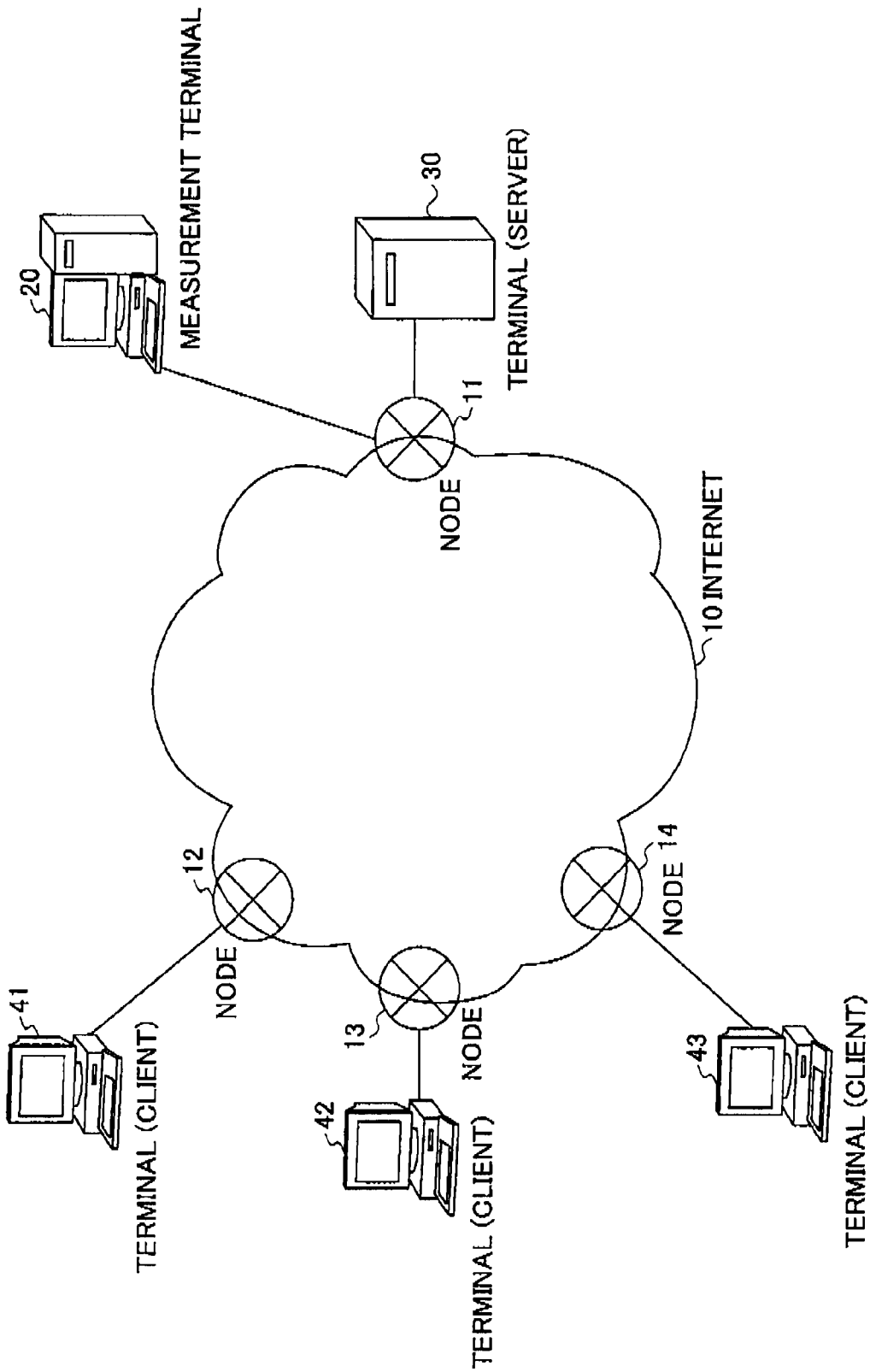

FLOW RECORD RESTRICTION APPARATUS AND THE METHOD

TECHNICAL FIELD

The present invention relates to a network apparatus used in an open network environment as typified by the Internet. More particularly, the present invention relates to an information communication apparatus as typified by a node and the like that can collect information (Flow Records) for measuring traffic on the network.

BACKGROUND ART

In the IP (Internet Protocol) used in the Internet, information of protocol, source IP address, and destination IP address is managed. In addition, in a part of transport protocols, information of source port and destination port is managed. Packets transmitted using these protocols include information managed by each protocol. Flow measurement is a method for classifying types of communications based on the information included in the packets.

In the flow measurement, packets that have the same attributes are regarded as packets belonging to the same communication. For example, packets having the same information in each item of protocol, source IP address, destination IP address, source port and destination port are regarded as packets belonging to the same communication. A set of packets belonging to the same communication is called a flow. By measuring a data amount or a packet amount of the flow, a plurality of communication services can be monitored among a plurality of locations, so that it becomes possible to specify a section of locations or a communication service in which communication amount is extremely large, and it becomes possible to ascertain communication trend.

The Internet is constructed by interconnecting a plurality of networks each including a plurality of routers for performing routing. A packet transmitted from a source reaches a destination via some routers. Since the router transfers a packet by referring to the IP header of the packet or referring to a header of transport layer in some cases, the router is suitable as an apparatus for performing classification of flows. As a technique for reporting Flow Records of packets passing through the router to another apparatus, there are NetFlow (refer to non-patent document 1) and IPFIX (IP Flow Information, export) and the like.

By transmitting measurement packets, obtained by packetizing Flow Records according to a specific format, to a measurement terminal on the network, communication information of the node can be analyzed. However, according to the non-patent document 2, the number of flows abruptly increases when attack traffic called DDoS (Distributed Denial of Service) occurs in which a large amount of traffic is continuously transmitted by distributing source addresses, and when attack traffic called port scan occurs in which service state and vulnerability are detected by trying to connect to every port of a target host.

In addition, according to the non-patent document 3, in IPFIX for reporting Flow Records, UDP (User Datagram Protocol) which does not have congestion control, and TCP (Transmission Control Protocol) or SCTP (Stream Control Transmission Protocol) having congestion control can be used. When an apparatus for sending and receiving flows performs transmission by using UDP which does not have the congestion control function, as the number of flows increases abruptly, the number of packets transmitted from the flow transmission apparatus such as a router to a measurement terminal increases. As a result, there is a possibility that congestion occurs in a measurement network between the flow transmission apparatus and the measurement terminal.

On the other hand, when the apparatus for sending and receiving flows performs transmission using TCP or SCTP having the congestion control function, even if the number of flows increases abruptly, congestion does not occur. However, since the number of Flow Records that can be sent is limited in the flow transmission apparatus due to the congestion control function, the number of Flow Records that can be transmitted becomes smaller that the number of Flow Records that are generated. Thus, there is a case in which internal transmission buffer overflows. As a result, Flow Records that can be transmitted is limited to Flow Records generated first, so that information of the whole observed traffic cannot be sent.

[Non Patent document 1] Browsed on Sep. 8, 2006 on the Internet, B. Claise. Cisco Systems NetFlow Services Export Version 9. RFC 3954 (Informational), October 2004. http://www.ietf.org/rfc/rfc3954.txt

[Non Patent document 2] Cristian Eatan, Ken Keys, David Moore, George Varghese: "Building a better netflow", ACM SIGCOMM Computer Communication Review, 34, Issue 4, pp. 245-256 (2004)

[Non Patent document 3] B. Claise. IPFIX Protocol Specification. Internet Draft, June 2006. HYPERLINK "http://tools.ietf.org/id/draft-ietf-ipfix-protocol-22.txt" http://tools.ietf.org/id/draft-ietf-ipfix-protocol-22.txt

DISCLOSURE OF THE INVENTION

Problem to be Solved by the Invention

As mentioned above, in a communication system adopting flow technology such as NetFlow (refer to non-patent document 1) and IPFIX, when the flow increases due to attack traffic, there occurs a problem in that congestion occurs in the communication of the measurement network. Or, there is a problem in that, although congestion does not occur, inaccurate information transmission occurs since information of the whole observed traffic cannot be transmitted. In the following, this problem is described in detail.

FIG. 20 shows an information communication system for performing packet communications via the Internet that includes a measurement network. As shown in FIG. 20, the Internet 10 is formed by interconnecting a plurality of networks including a plurality of nodes 12-14 and 111 that perform packet transfer. The nodes 12-14 and 111 are connected such that they can communicate with each other. The node 111 is connected to a measurement terminal 20 and a terminal 30. A terminal 41 is connected to the node 12, a terminal 42 is connected to the node 13, and a terminal 43 is connected to the node 14.

Each of the measurement terminal 20 and terminals 30 and 41-43 is a computer system including a communication function. The main part of the computer system includes a storage device for storing programs and the like, an input apparatus such as a keyboard and a mouse, a display apparatus such as a CRT and a LCD, a communication apparatus such as a modem for performing communication from/to the outside, an output apparatus such as a printer, and a control apparatus for controlling operation of the communication apparatus, the output apparatus and the display apparatus by receiving an input from the input apparatus. The terminals 41-43 are client terminals, the terminal 30 is a server for providing communication services to clients. Communications are performed between the server and the clients.

There is a case in which the terminals 41-43 are infected with a virus or a worm. In addition, invalid control may be performed for the terminals 41-43 by a third party. In these cases, the terminals 41-43 perform network attacks for the terminal 30. When a plurality of terminals start network attacks simultaneously, the source addresses are distributed. In addition, also when one terminal performs network attacks, there is a case in which source addresses are diversified due to source address spoofing. In this manner, a large amount of data in which source addresses are distributed arrive at the node so that abnormal traffic occurs.

In addition, in activities such as IP scan and port scan which are similar to attacks, and in infection activities of the virus and the worm and the like, communications are performed by diversifying destination addresses irrespective of existence of the nodes, so that there is a case in which abnormal traffic occurs. Also in this case, source addresses may be diversified due to fraud and the like.

By the above-mentioned attacks, communication amount in the whole of the Internet increases. As a result, traffic transmitted on the network in which the node 111 is a gateway increases, for example, traffic to the terminal 30 increases. The increase of the traffic causes following problems in the node 111 in which congestion occurs in communications of the measurement network and information of the whole observed traffic cannot be transmitted.

The node 111 transmits measurement packets generated by packetizing Flow Records to the measurement terminal 20. When UDP that does not perform congestion control is used as a transport protocol, as the number of flows observed in the node 111 increases, transmission amount of the measurement packets also increases. Accordingly, congestion occurs in the measurement network between the node 111 and the measurement terminal 20, which means that secondary damage due to the attack occurs.

The measurement terminal 20 is placed for discovering abnormal traffic when lines used for normal communications between the node 111 and the terminal 30 and between the node 111 and the Internet 10 become abnormal. However, if congestion occurs in communications between the node 111 and the measurement terminal 20 due to abrupt increase of flows, loss of measurement packets increases so that it becomes difficult for the measurement terminal 20 to sufficiently perform measurement. In addition, when other communications are performed, there is a case in which the congestion affects the other communication. Depending on circumstances, there is a case in which the measurement terminal 20 falls into a resource lacking state.

In addition, in a system in which the measurement terminal 20 receives Flow Records from a plurality of nodes, the damage of the congestion further increases.

On the other hand, when using TOP or SCTP that has a congestion control function as a transport protocol, congestion does not occur in the communication between the node 111 and the measurement terminal 20. However, due to the congestion control function, the number of output flows of the node 111 is limited. Thus, there is a case in which the number of flows that the node 111 can output becomes less than the number of flows observed in the abnormal state. In this way, when the number of input flows becomes larger than the number of output flows, the internal buffer of the node 111 overflows so that a part of measurement information drops. Thus, the node 111 cannot transmit the whole information of the measured traffic to the measurement terminal 20 accurately.

An object of the present invention is to solve the above-mentioned problems and to provide a Flow Record restriction apparatus that can restrict the number of Flow Records to be transmitted while maintaining measurement information of the whole traffic.

Means for Solving the Problem

For solving the above-mentioned problem, a Flow Record restriction apparatus of the present invention is a Flow Record restriction apparatus that is placed in a network interconnecting a plurality of terminals and that is connected to a measurement terminal for measuring traffic in the network via a measurement network, including:

a Flow Record generation unit configured to determine a set of packets having the same attribute to be a flow of the same communication, and to generate a Flow Record based on header information of the packets for each flow;

a Flow Record number restriction unit including a management buffer for temporarily storing Flow Records generated by the flow record generation unit, the Flow Record number restriction unit being configured to read the Flow Records from the management buffer and, output the Flow Records; and a Flow Record transmission unit configured to packetize the Flow Records output from the Flow Record number restriction unit to transmit packets over the measurement network, wherein, when a number of Flow Records stored in the management buffer exceeds a preset upper limit value, the Flow Record number restriction unit divides the stored Flow Records into non-aggregation Flow Records and aggregation candidates having lower importance in measurement of traffic than the non-aggregation Flow Records, aggregates Flow Records determined to be the aggregation candidates, and performs control such that a number of Flow Records stored in the management buffer becomes equal to or less than a predetermined number.

As flows increase due to attack traffic, the number of Flow Records that are generated by the flow generation function unit increases. According to the above-mentioned configuration, when the number of Flow Records input from the flow generation function unit increases, the Flow Record number restriction function unit aggregates currently stored Flow Records. By this aggregation of Flow Records, only equal to or less than a predetermined number of Flow Records are provided to the flow record transmission unit. Therefore, the number of Flow Records that the flow transmission function unit transmits over the measurement network per a predetermined time is also limited to equal to or less than a predetermined number.

In addition, since only Flow Records the number of which is equal to or less than a predetermined number are provided to the flow transmission function unit, the internal buffer in the flow transmission function unit does not overflow so that Flow Records are not lost. Therefore, the problem that occurs if TCP or SCTP having congestion control function is used as a transport protocol does not occur, wherein the problem is that, information of the whole observed traffic cannot be correctly transmitted due to loss of Flow Records caused by overflow of the internal buffer in the flow transmission function unit.

Effect of the Invention

According to the present invention, irrespective of increase of flows, only Flow Records equal to or less than a predetermined number are transmitted over the measurement network. Thus, it becomes possible to suppress congestion of communication on the measurement network, which congestion occurs when using UDP having no congestion control function as a transport protocol.

In addition, the loss of Flow Records due to overflow of internal buffer in the flow transmission function unit, which occurs if TCP or SCTP having congestion control function is used as a transport protocol, can be suppressed. Thus, information of the whole observed traffic can be transmitted to the measurement terminal correctly.

BRIEF DESCRIPTION OF THE DRAWINGS

FIG. 3 is a schematic diagram showing an example of a structure of the measurement buffer managed by the Flow Record number restriction function unit shown in FIG. 2;

FIG. 4 is a diagram for explaining the Flow Record and the data structure definition information;

FIG. 5 is a diagram for explaining a reporting method using option information;

FIG. 6 is a schematic diagram showing definition information provided with condition priority and an example of conditions developed and used based on the definition information;

FIG. 7 is a schematic diagram showing definition information provided with condition priority and another example of conditions developed and used based on the definition information;

FIG. 9 is a diagram for explaining input format of definition information;

FIG. 10 is a diagram for explaining another input format of definition information;

FIG. 17 is a diagram for describing a method for suppressing decrease of efficiency when regenerating tree structure for each condition;

FIG. 20 is a block diagram showing a general configuration of an information communication system including a measurement network.

Figure 1:
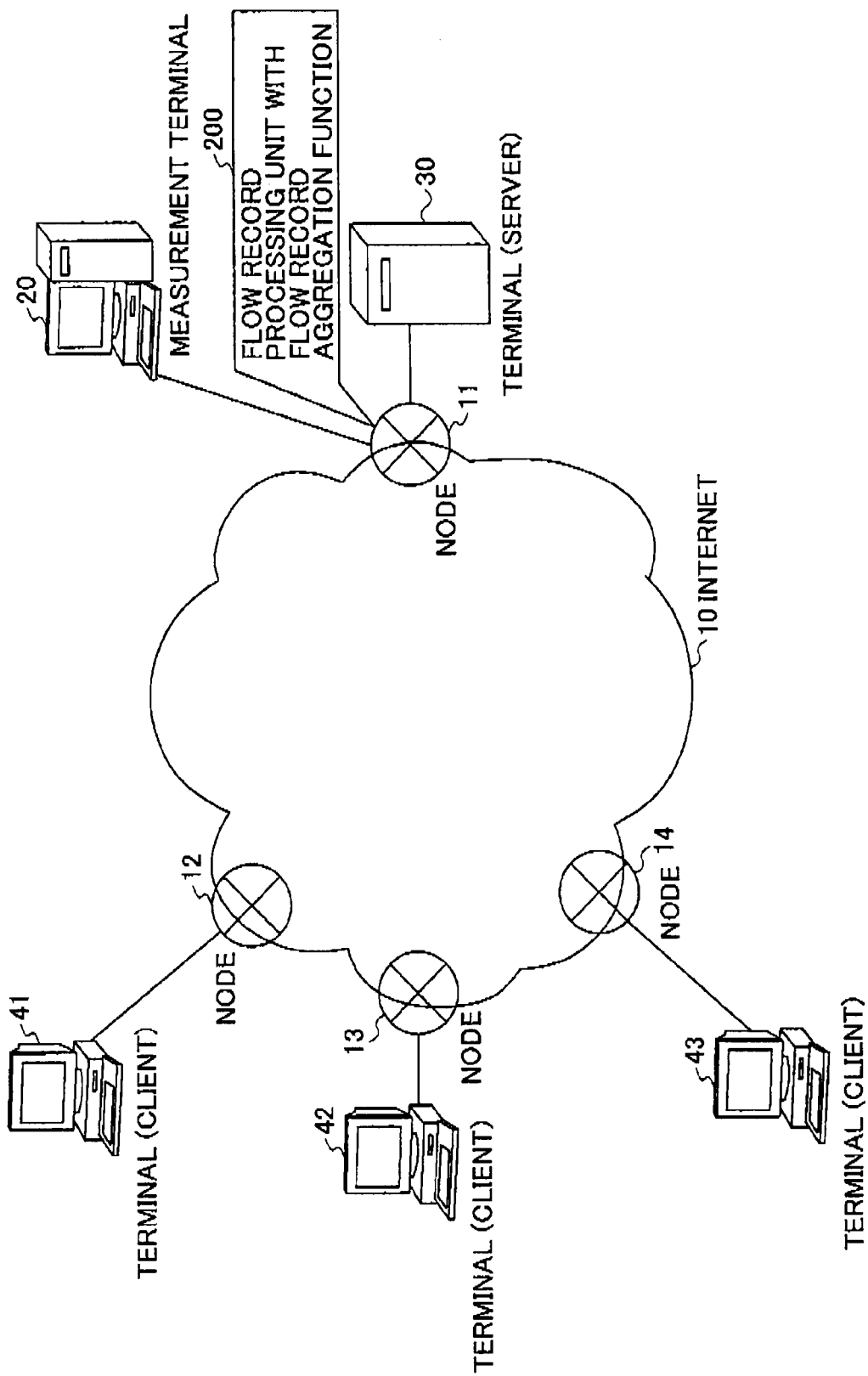
FIG. 1 is a block diagram showing an example of an information communication system to which the present invention is applied.

DESCRIPTION OF REFERENCE SIGNS 10 the Internet
11-14 node
20 measurement terminal
30, 41-43 terminal
200 Flow Record processing unit
201 measurement network interface
202 flow generation function unit
203 Flow Record number restriction function unit
204 flow transmission function unit
205 output network interface

PREFERRED EMBODIMENTS FOR CARRYING OUT THE INVENTION

Next, embodiments of the present invention are described by referring to drawings.

FIG. 1 is a diagram showing an example of an information communication system to which the present invention is applied. Except that the node 11 is provided instead of the node 111, the information communication system is the same as the system shown in FIG. 20. The Internet 10 is a network interconnecting a plurality of networks including the nodes 11-14 that perform packet transfer. The nodes 11-14 are connected such that they can communicate with each other. The measurement terminal 20 and the terminal 30 are connected to the node 11.

In the information communication system, the node 11 includes a Flow Record processing unit 200 having a Flow Record aggregation function. In this point, the information communication system is different form the information communication system shown in FIG. 20.

Figure 2:
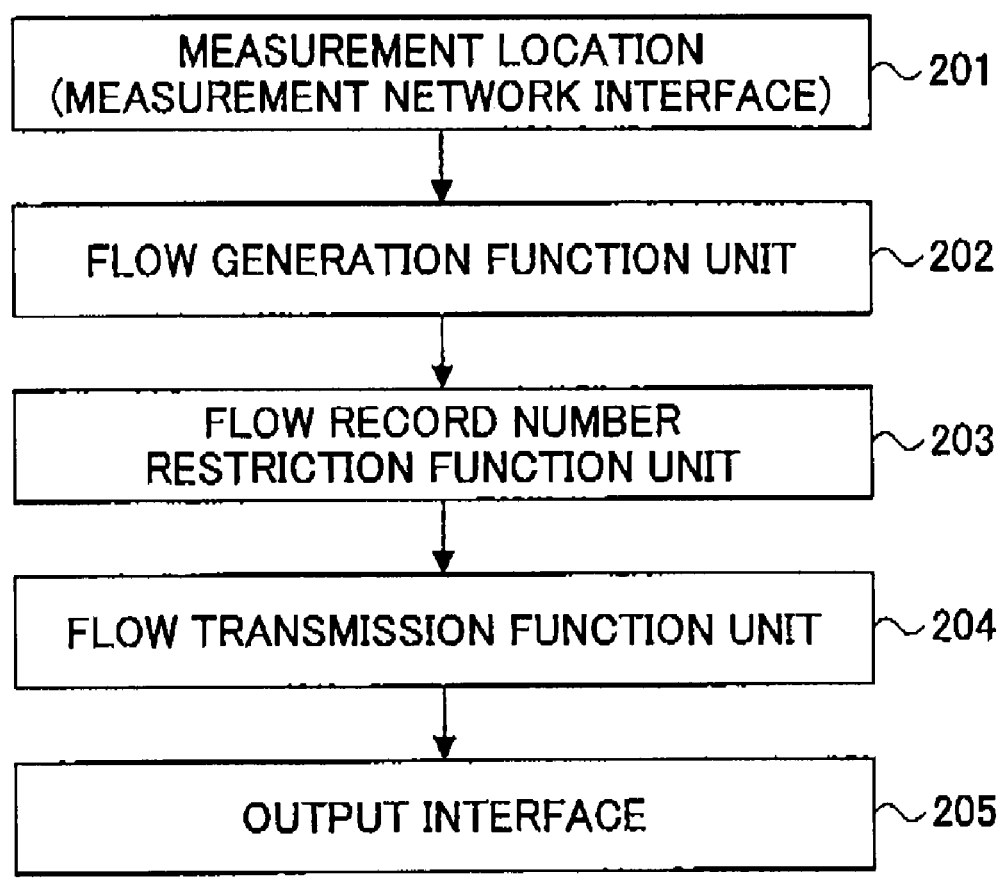
FIG. 2 is a block diagram showing a configuration of a node which is an embodiment of the Flow Record restriction apparatus of the present invention.

FIG. 2 shows a configuration of the Flow Record processing unit 200 of the node 11 according to an embodiment of the Flow Record restriction apparatus of the present invention. By referring to FIG. 2, the Flow Record processing unit 200 includes a measurement network interface 201, a flow generation function unit 202, a Flow Record number restriction function unit 203, a flow transmission function unit 204 and an output network interface 205.

The measurement network interface 201 includes a plurality of network interfaces each collecting packets that arrives from each terminal via the Internet. The packets collected by the measurement network interface 201 are supplied to the flow generation function unit 202.

The flow generation function unit 202 is provided in an existing transmission apparatus that uses a flow reporting protocol such as NetFlow, IPFIX and the like, and generates Flow Records based on header information of packets collected via the measurement network interface 201. More particularly, the flow generation function unit 202 identifies packets in which information pieces included in the header of the packets such as protocol, source IP address, destination IP address, source port and destination port are the same, or information pieces determined from the header of the packets such as routing information are the same, and the flow generation function unit 202 regards the identified packets to be packets that belong to the same communication, and generates information (Flow Record) on flow that is a set of the packets. In the generation of Flow Records, processing for updating time information based on a condition of generating a flow is also performed. Generally, there are many cases in which a Flow Record includes information of protocol, source IP address, destination IP address, source port and destination port. The Flow Record generated by the flow generation function unit 202 is provided to the Flow Record number restriction function unit 203.

The Flow Record number restriction function unit 203 includes a management buffer unit for temporarily storing and managing Flow Records input from the flow generation function unit 202. The Flow Record number restriction function unit 203 reads Flow Records from the management buffer unit and provides the Flow Records to the flow transmission function unit 204. An upper limit value of the number of Flow Records managed in the management buffer unit is configured beforehand. When the number of Flow Records that are provided from the flow generation function unit 202 per a predetermined time increases so that the number of Flow Records stored and managed in the management buffer unit exceeds the upper limit value, the Flow Record number restriction function unit 203 divides Flow Records stored in the management buffer unit into aggregation candidates and non-aggregation Flow Records, and performs aggregation processing for the aggregation candidates. The upper limit value is determined as a value by which the management buffer unit and the internal buffer of the flow transmission function unit 204 do not overflow and by which congestion does not occur in communication in the measurement network, in consideration of communication capability of the measurement network (communication capability of the network between the node 11 and the measurement terminal 20), processing capability of the flow transmission function unit 204, and reading speed from the management buffer unit and the like. Importance of measurement of traffic for the aggregation candidates is lower than that of the non-aggregation Flow Records.

The flow transmission function unit 204 is provided in an existing transmission apparatus that uses a flow reporting protocol such as NetFlow, IPFIX and the like. The flow transmission function unit 204 is provided with an internal buffer for temporarily storing Flow Records provided from the Flow Record number restriction function unit 203, generates a measurement packet by packetizing Flow Records read from the internal buffer in a proper size, and transmits the measurement packet with a specific header over the network from the output network interface 205. The measurement packet transmitted from the output network interface 205 is provided to the measurement terminal 20. The measurement network interface 201 and the output network interface 205 may be physically the same one.

As to a buffer for storing the Flow Records generated by the flow generation function unit 202, the management buffer unit for performing management by the Flow Record restriction function unit 203 and a butter in which the flow transmission function unit 204 temporarily stores Flow Records, a part or the whole of storage areas of the buffers may be independent with each other or may be shared.

Next, operation of the node 11 is described concretely.

In the node 11, the Flow Record number restriction function unit 203 only sends Flow Records the number of which is equal to or less than a predetermined number to the flow transmission function unit 204 irrespective of the number of Flow Records input from the flow generation function unit 202. Thus, the amount of measurement packets transmitted from the node 11 to the measurement terminal 20 is also restricted to equal to or less than a predetermined amount.

FIG. 3 shows an example of a structure of the measurement buffer managed by the Flow Record number restriction function unit 203. The measurement buffer includes a buffer B1 in which Flow Records input from the flow generation function unit 202 are stored after being sorted based on ranking according to measurement purposes, and includes buffers B2-B7 provided by being associated with respective aggregation conditions each having different comparison items, wherein each aggregation condition includes a set of items of a corresponding flow generation condition.

The buffer B1 includes a non-aggregation part B1-1 and an aggregation candidate part B1-2. Each Flow Record stored in the buffer B1 is a Flow Record satisfying a condition (flow generation condition) for identifying packets belonging to the same communication, in which the condition was used for generating the Flow Record in the flow generation function unit 202. In the buffer B1, the flow generation condition is a condition on five items of protocol, source IP address, destination IP address, source port and destination port.

The flow generation condition is not limited to the above-mentioned five items. As a flow generation condition, the system may use information based on packet header including MAC address, IP address and port number, or information on routing such as next hop and AS number which are determined from the information based on the packet header. Similarly, since the buffers for managing aggregated information are generated by deleting a part of the items of the original condition, conditions for the buffers B2-B7 are not limited to those shown in FIG. 3.

When using the protocol such as NetFlow and IPFIX for reporting Flow Records to other apparatuses, Flow Records of measured traffic and data structure definition information (called Template) for defining a format of the Flow Record are sent to the measurement terminal 20.

FIG. 4 shows examples of the Flow Record and the data structure definition information. According to the definition information, a header of four bytes for definition information follows after a header of four bytes common to definition information and Flow Record. And after that, items that form a Flow Record are enumerated.

In the header of four bytes common to definition information and Flow Record, an ID called SetID is shown using two bytes, and the length of information is indicated by next two bytes. SetID is used for distinguishing among normal definition information, after-mentioned optional definition information, and Flow Record/optional information corresponding to the definition information. In the case of NetFlow, 0 corresponds to normal definition information, 1 corresponds to option information, a value equal to or greater than 256 corresponds to Flow Record/optional information. In the case of IPFIX, 2 corresponds to normal definition information, 3 corresponds to option information, and a value equal to or greater than 256 corresponds to Flow Record/optional information.

The header for normal definition information following the header of four bytes common to definition information and Flow Records includes Template ID of two bytes and field count of two bytes. The Template ID of two bytes is for indicating which Flow Record for data structure to be defined, and is the same as SetID of corresponding Flow Record. The field count indicates the number of items following the Template ID.

Each item constituting field information represents one piece of information every four bytes. The first half two bytes of the four bytes represent an ID of the item, and the latter half two bytes represents the size (the number of bytes) of the item. In the example shown in FIG. 4, there are 12 items forming field information, and IDs and numbers of bytes are shown for each item. For example, the first item represents that sourceIPv4Address (ID:8) indicating the source address of IPv4 is four bytes, and the next item shows that destinationIPv4Address (ID:12) indicating the destination address of IPv4 is four bytes. Accordingly, the data structure of the Flow Record is defined by the respective items.

All of the items that form the field information shown in FIG. 4 are not necessarily used as the flow generation condition. For example, the counter (packetDeltaCount (ID:2), octetDeltaCount (ID:1) shown in FIG. 4)) that indicates packet amount or byte amount and time information (flowStartSysUpTime (ID:22), flowEndSysUpTime (ID:21) shown in FIG. 4)) cannot be used as the flow generation condition. Also, all of items other than these are not necessarily used as the flow generation condition. In the case of IPFIX, items that become a flow generation condition are explicitly reported by separate option information. In the case of NetFlow, since there is not such a function, the flow generation condition depends on implementation of the apparatus. In the case of IPFIX, an item that becomes the flow generation condition is called a Flow Key.

FIG. 5 schematically shows a reporting method using the option information. For representing the option information, relationship between option data structure definition information and option information is the same as relationship between normal flow data structure definition information and Flow Record. However, the option information is provided with information called scope indicating a range of information.

In the option data structure definition information, next to field count, scope field count of two bytes is added, and after that, items are enumerated. In the items, a first number to which the scope field count is added becomes the scope. In the example shown in FIG. 5, TemplateId (the usage is the same as that of the above-mentioned Template ID) is the scope. In addition, flowKeyIndicator that indicates the flow generation condition is defined.

The format of the option information is generated according to the option data structure definition information, and concrete values are set as option information. For example, for generating option information corresponding to the Flow Record shown in FIG. 4, a value corresponding to TemplateID becomes 256. The flowKeyIndicator is formed as a bit map of 64 bits, and each bit indicates whether a corresponding item can be used as an item of a flow generation condition. That is, as to each of 64 items at the maximum from the top, flowKeyIndicator can indicate whether the item is used as a flow generation condition.

In the definition information shown in FIG. 4, when sourceIPv4Address, destinationIPv4Address, protocolIdentifier, sourceTransportPort, and destinationTransportPort are items of a flow generation condition, since they are located at a first position, a second position, a sixth position, a seventh position, and an eighth position respectively, a first bit, a second bit, a sixth bit, a seventh bit and an eighth bit become 1 respectively in the data of flowKeyIndicator.

When using these Flow Record reporting protocols, the user specifies IDs and the sizes of items to be included in a Flow Record that the user wants to send. In addition, in the present embodiment, priorities set by the user are provided to conditions that are used as the flow generation condition. By deleting conditions from a low priority condition, a new set of conditions are generated.

FIG. 6 and FIG. 7 show definition information having condition priorities and examples of conditions developed and used based on the definition information.

In the example shown in FIG. 6, different values are provided as condition priorities to five items of sourceIPv4Address, destinationIPv4Address, protocolIdentifier, sourceTransportPort and destinationTransportPort. According to these priorities, one set of conditions is generated for each of a case when the number of deletions is 0, a case when the number of deletions is 1, a case when the number of deletions is 2, a case when the number of deletions is 3, and a case when the number of deletions is 4. Thus, five sets of conditions are generated at the maximum.

When a same priority is provided for a plurality of items, items of the same priority are used exclusively. In the example shown in FIG. 7, priority of each of the items of sourceIPv4Address and destinationIPv4Address is 2, and priority of the item of protocolIdentifier is 1 and priority of each of the items of sourceTransportPort and destinationTransportPort is 4. According to these priorities, one set of conditions is generated when the number of deletions is 0, two sets of conditions are generated when the number of deletions is 1, three sets of conditions are generated when the number of deletions is 2, two sets of conditions are generated when the number of deletions is 3, and one set of conditions is generated when the number of deletions is 4. Thus, a set of seven conditions is generated at the maximum.

Figure 8:
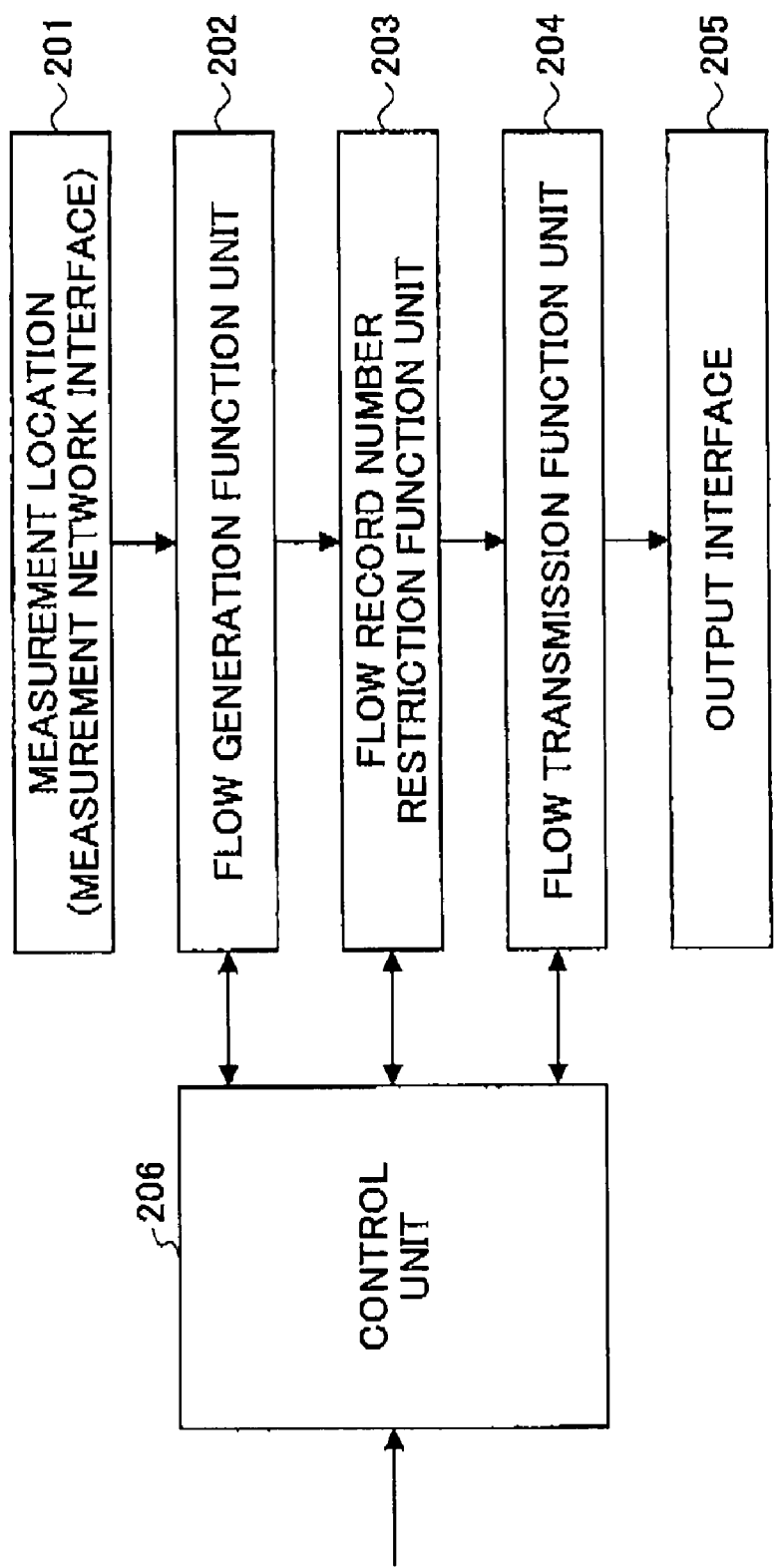
FIG. 8 is a block diagram showing a configuration of the Flow Record processing unit that can receive outside input on priorities.
Figure 9:
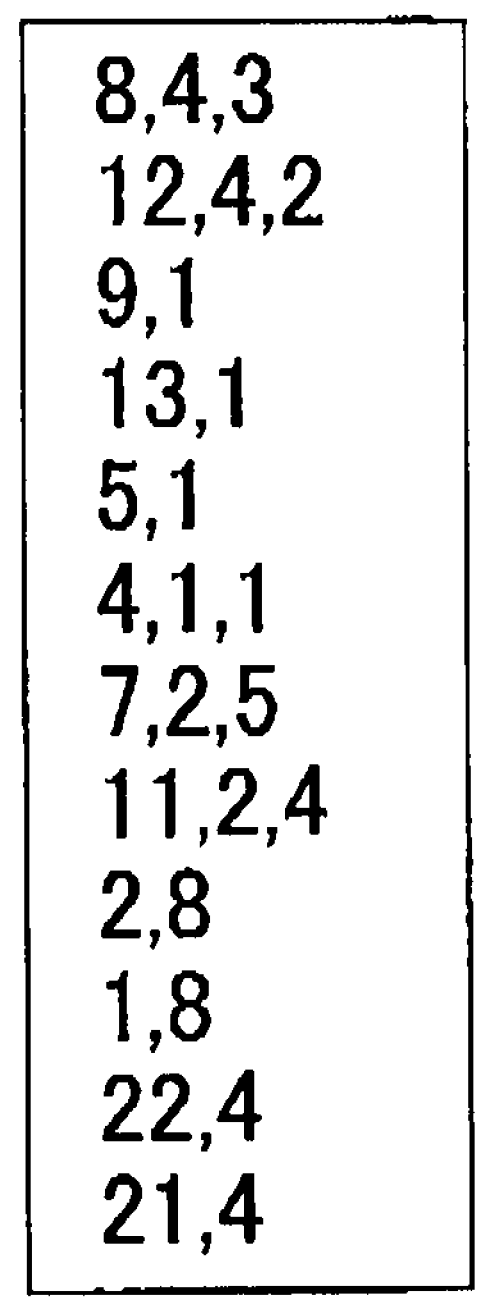

For receiving an outside input on these priorities, the Flow Record processing unit 200 may be configured as shown in FIG. 8. The Flow Record processing unit 200 shown in FIG. 8 is provided with a control unit 206 in addition to the configuration shown in FIG. 2. Each of the flow generation function unit 202, the Flow Record number restriction function unit 203 and the flow transmission function unit 204 sends and receives information with the control unit 206. Input format of the definition information may be text format of cvs (comma delimited text) shown in FIG. 9 or space/tab delimited text, or may be a text using descriptive language such as XML as shown in FIG. 10. The example shown in FIG. 10 is an format that is obtained by uniquely adding an element of flowKeyPrecedence indicating condition priorities to the description scheme of "Configuration Data Model for IPFIX and PSAMP" (http://tools.ietf.org/wg/ipfix/draft-muenz-ipfix-configuration-01.txt (obtained on May 15, 2006)) proposed in IETF.

The information generated by the flow generation function unit 202 is provided to the Flow Record number restriction function unit 203. In the Flow Record number restriction function unit 203, before the information generated by the flow generation function unit 202 is transmitted to the flow transmission function unit 204, items that are deleted from flow aggregation conditions are deleted from the Template, or the deleted items are excluded from the bit map of flowKeyIndicator. Since it is necessary to handle all of these as different Templates, each of them is provided with a different Template ID by the flow transmission function unit 204 and is transmitted via the output network interface 205. Accordingly, the Flow Record number restriction function unit 203 holds items corresponding to attributes of packets used for generation of Flow Records performed by the flow generation function unit 202 and holds priorities of the items, and the Flow Record number restriction function unit 203 repeats processes for deleting an item of the lowest priority from items for generating Flow Record, so that comparison items are changed in stages.

In sorting according to measurement purposes, for example, when the measurement purpose is to detect traffic in which communication data amount has increased due to attacks of DoS and the like, Flow Records are sorted based on size relation of data amounts included in the Flow Records. When the measurement purpose is to detect traffic on attacks such as TCP SYN DoS and the like, Flow Records are sorted based on size relation of the number of messages such as SYN and the like included in the Flow Records. When the measurement purpose includes a plurality of items, Flow Records are sorted after prioritizing and weighting for the number of pieces of data for each item included in Flow Records. Further, statistical values such as standard deviation and dispersion values of these values can be used as an index for sorting. The sorting method can be changed between descending order and ascending order according to the purposes.

Based on a non-aggregation number provided from the outside, the non-aggregation part B1-1 stores, as non-aggregation Flow Records, the non-aggregation number of higher ranked Flow Records of the sorted Flow Records. The aggregation candidate part B1-2 stores, as aggregation candidates, Flow Records of the sorted Flow Records other than the non-aggregation Flow Records. In FIG. 3, as to Flow Records stored in the non-aggregation part B1-1 and the aggregation candidate part B1-2, the rank becomes lower toward the left side in the figure, and becomes higher toward the right side.

The buffer B2 stores aggregated Flow Records each of which is obtained by aggregating Flow Records among which four items (aggregation condition) of protocol, source address, destination address and destination port in the flow generation condition agree. The buffer B3 stores aggregated Flow Records each of which is obtained by aggregating Flow Records among which four items (aggregation condition) of protocol, source address, destination address and source port in the flow generation condition agree.

The buffer 64 stores aggregated Flow Records each of which is obtained by aggregating Flow Records among which three items (aggregation condition) of protocol, source address and destination address in the flow generation condition agree. The buffer B5 stores aggregated Flow Records each of which is obtained by aggregating Flow Records among which two items (aggregation condition) of protocol and destination address in the flow generation condition agree. The buffer B6 stores aggregated Flow Records each of which is obtained by aggregating Flow Records among which two items (aggregation condition) of protocol and source address in the flow generation condition agree. The buffer B7 stores aggregated Flow Records each of which is obtained by aggregating Flow Records among which protocol (aggregation condition) in the flow generation condition agrees.

The aggregation conditions are arranged in the order of buffer B2, buffer B3, buffer B4, buffer B5, buffer B6, and buffer B7 starting from the buffer having the largest number of items forming the condition. In FIG. 3, the number of items forming the condition increases toward the upper side of the figure, and decreases toward the lower side of the figure.

When the number of Flow Records stored and managed in the management buffer unit is equal to or less than an upper limit value, the Flow Record number restriction function unit 203 sequentially reads Flow Records from the buffer B1 and provides the Flow Records to the flow transmission function unit 204. When the number of Flow Records stored and managed in the management buffer unit exceeds the upper limit value, the Flow Record number restriction function unit 203 sorts Flow Records stored in the buffer B1 according to measurement purposes so as to store the higher-ranked Flow Records into the non-aggregation part B1-1, and stores lower-ranked Flow Records in the aggregation candidate part B1-2. Then, Flow Record aggregation processing is executed for the Flow Records (aggregation candidates) stored in the aggregation candidate part B1-2. The Flow Records stored in the non-aggregation part B1-1 is sequentially read and provided to the flow transmission function unit 204 without being aggregated.

In the present embodiment, sorting of Flow Records stored in the buffer B1 is performed when the number of managed Flow Records exceeds the upper limit value. Alternatively, the Flow Records provided from the flow generation function unit 202 may be sorted using an algorithm of insertion sort and the like, so that sorted Flow Records may be stored in the buffer B1.

Figure 11:
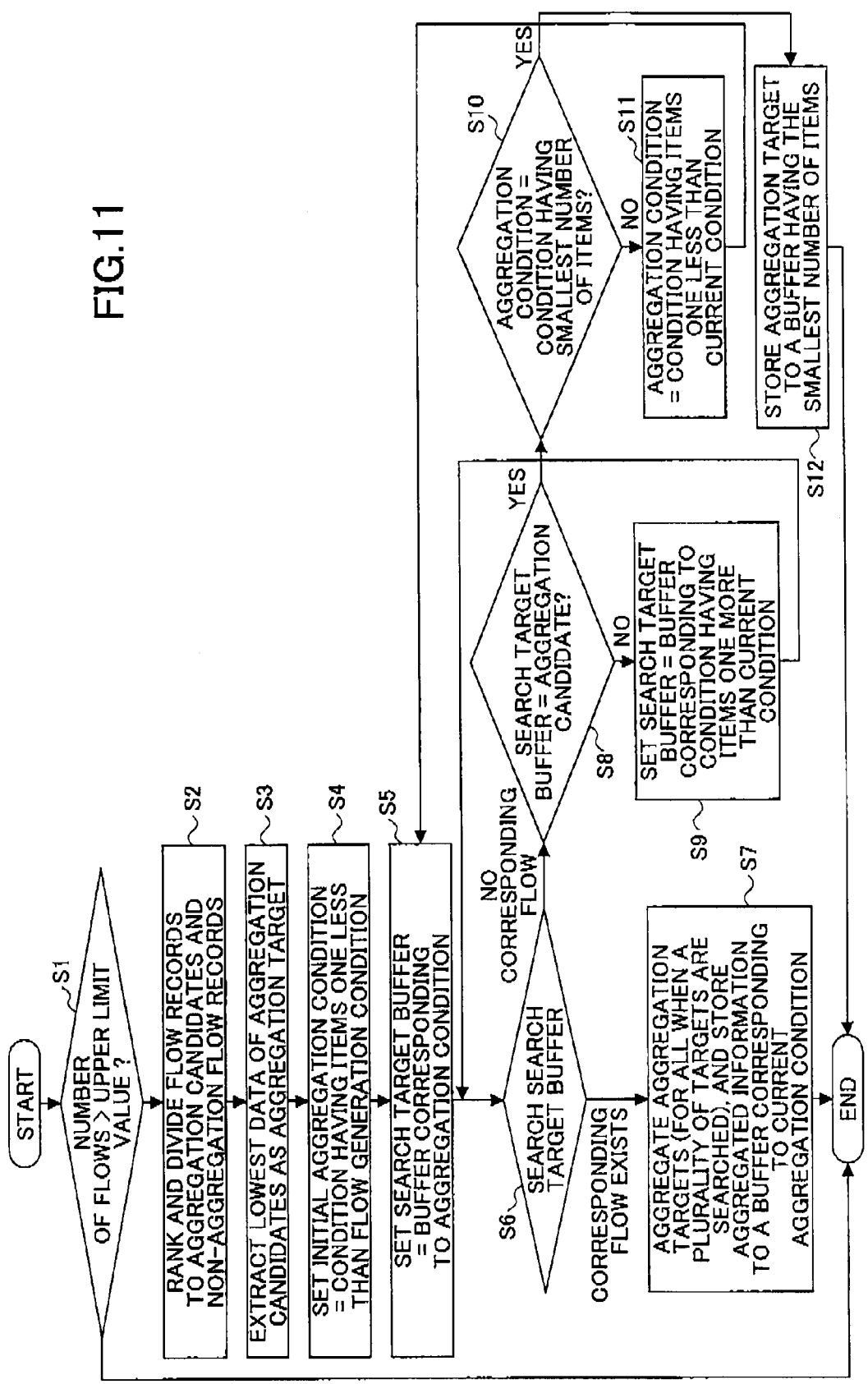
FIG. 11 is a flowchart showing a procedure of the Flow Record aggregation processing performed by the Flow Record number restriction function unit shown in FIG. 2.

Next, Flow Record aggregation processing performed by the Flow Record number restriction function unit 203 is described concretely. FIG. 11 shows a procedure of the Flow Record aggregation processing.

First, it is determined whether the number of Flow Records stored and managed in the management buffer unit exceeds the upper limit value (step S1). This determination is performed at predetermined intervals or may be performed each time when a Flow Record is input from the flow generation function unit 202.

When the number of managed Flow Records exceeds the upper limit value, the Flow Records stored in the buffer B1 are sorted so that they are divided into aggregation candidates and non-aggregation Flow Records (step S2). Next, a lowest ranked Flow Record of the aggregation candidates is extracted as an aggregation target (step S3). Next, an initial aggregation condition is set (step 4). The initial aggregation condition is a condition having items one less than the flow generation condition. More particularly, the initial aggregation condition is an aggregation condition on the buffer B2 shown in FIG. 3. Next, a buffer corresponding to the aggregation condition is set as a search target buffer (step S5). When the aggregation condition on the buffer B2 shown in FIG. 3 is set, the buffer B2 becomes the search target buffer.

Next, it is determined whether the search target buffer includes an aggregated Flow Record that agrees with the aggregation target in all items of the set aggregation condition (step S6). When there is the aggregated flow information by which all items of the aggregation Flow Record that agrees with the aggregation target in all items of the set aggregation condition, the aggregation target is aggregated into the aggregated Flow Record and is stored in a buffer corresponding to the currently set aggregation condition (step S7). When a plurality of aggregated Flow Records agreeing with the aggregation target in all items of the set aggregation condition are found, the aggregation target is aggregated to all of the aggregated Flow Records.

When it is determined that there is no aggregated Flow Record that agrees with the aggregation target in all items of the set aggregation condition, it is determined whether the target buffer set in step S5 is the aggregation candidate part B1-2 (step S8). When the target buffer is not the aggregation candidate part B1-2, a buffer (having more items forming a condition) which is one level higher than a current buffer as the search target buffer (step S9), and the process goes to step S6.

When it is determined that the target buffer is the aggregation candidate part B1-2 in step S8, it is determined whether the currently set aggregation condition is a condition having the smallest number of items for constituting the condition (step S10). When the aggregation condition is not the condition having the smallest number of items, the aggregation condition is changed to a condition having items one less than the current condition (step S11), and the process goes to step S5. When the aggregation condition is a condition in which the number of items constituting the condition is the smallest, the aggregation target is stored in the buffer of the condition in which the number of items constituting the condition is the smallest (step S12).

The above-mentioned Flow Record aggregation processing is described concretely by taking the management buffer shown in FIG. 3 as an example.

After storing the higher-ranked Flow Records in the non-aggregation part B1-1 and storing the lower-ranked Flow Records in the aggregation candidate part B1-2 in step S2, in step S3, a lowest ranked Flow Record is extracted as an aggregation target from Flow Records stored in the aggregation candidate part B1-2. In FIG. 3, in the aggregation candidate part B1-2, a Flow Record located at leftmost position becomes the aggregation target.

Figure 12:
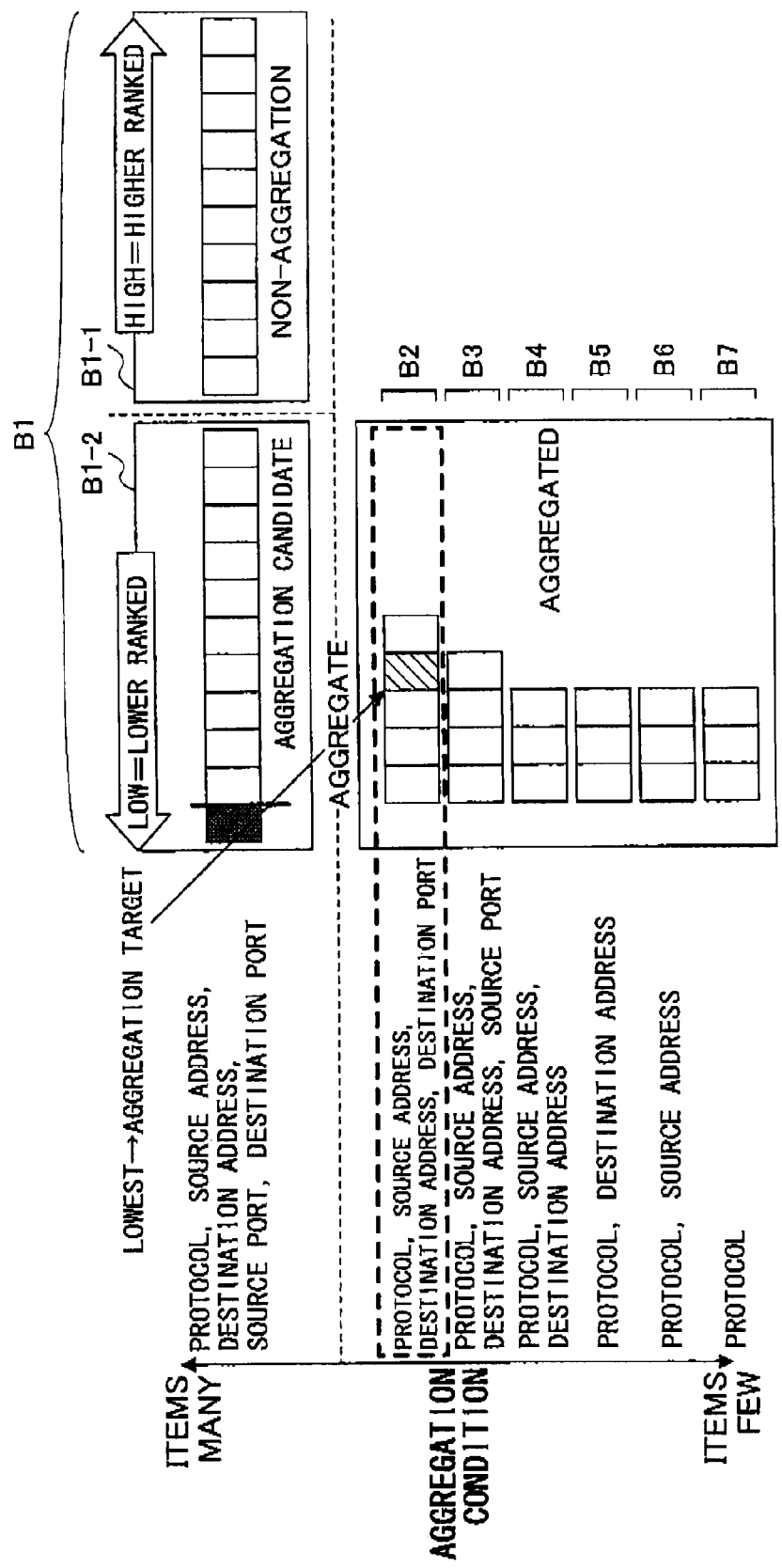
FIG. 12 is a schematic diagram showing an example of aggregation of Flow Records performed by the Flow Record number restriction unit shown in FIG. 2.

Next, in step S4, as an initial aggregation condition, a condition (aggregation condition of the buffer B2) having items one less than the flow generation condition is set. That is, as the initial aggregation condition, four items of protocol, source address, destination address and destination port of the flow generation condition are set. Next, in step S5, a buffer corresponding to the set aggregation condition is set as a search target buffer, and the buffer is searched in step S6. At this stage, it is determined whether there exists an aggregated Flow Record that agrees with the aggregation target in all items of the initial aggregation condition in the buffer B2 corresponding to the initial aggregation condition set in step S4. FIG. 12 shows a state in which the fourth aggregated Flow Record from the left in the buffer B2 agrees with the aggregation target. In this case, the aggregation target is aggregated to the fourth aggregated Flow Record. The aggregation target is deleted from the aggregation candidate part B1-2.

Figure 13:
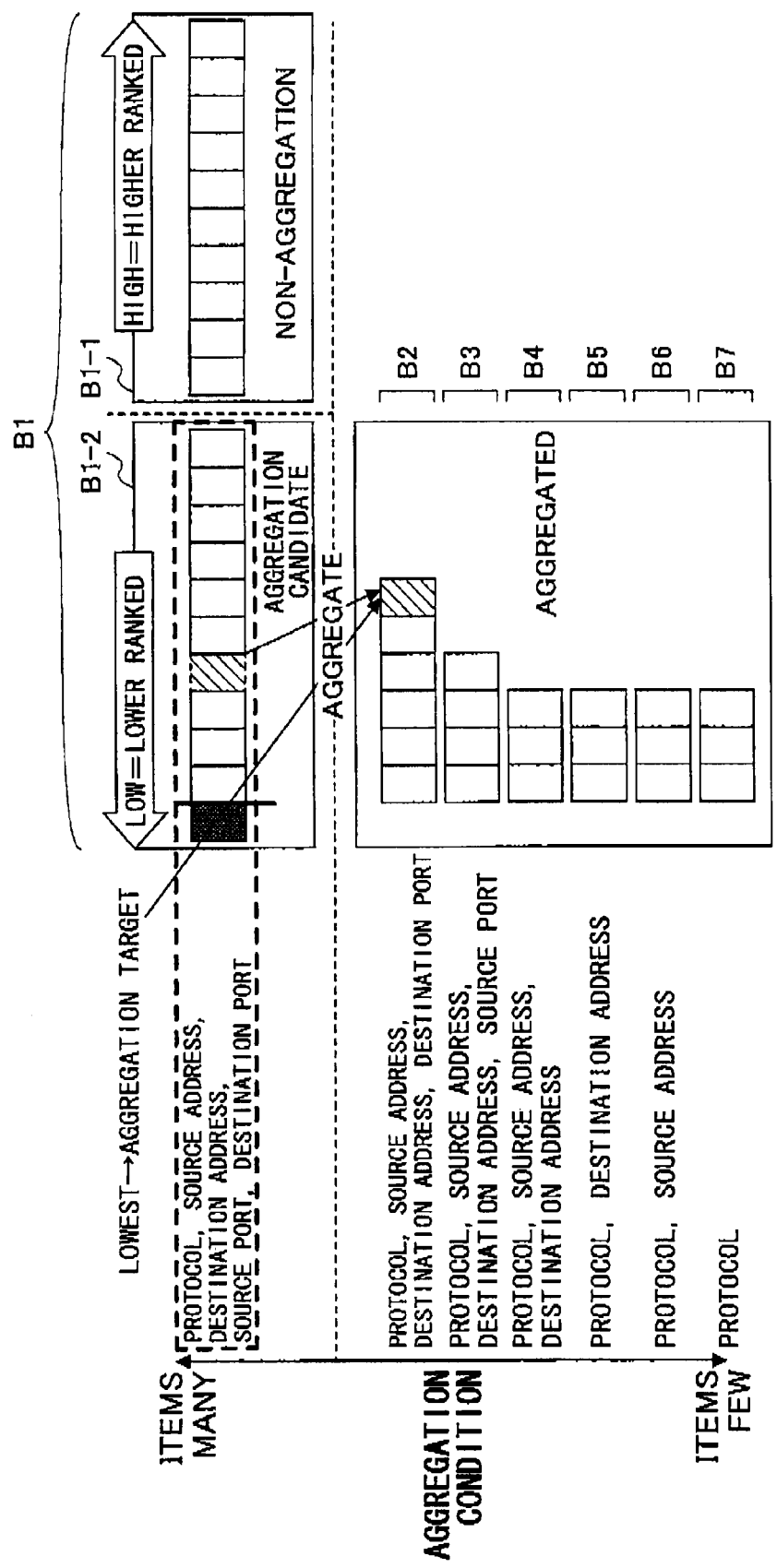
FIG. 13 is a schematic diagram showing another example of aggregation of Flow Records performed by the Flow Record number restriction unit shown in FIG. 2.

When there is no corresponding Flow Record in the determination of step S6, it is determined whether the search target buffer is the aggregation candidate part B1-2 in step S8. When the search target buffer is not the aggregation candidate part B1-2, a buffer one level higher than the current buffer is set to be a search target buffer, and then, going to step S6, it is determined whether there is the Flow Record. FIG. 13 shows a state in which the fifth Flow Record from the left in the aggregation candidate part B1-2 agrees with the aggregation target. In this case, the aggregation target and the fifth Flow Record are aggregated so that the aggregated record is stored in the buffer B2 as aggregated flow information. The aggregation target and the fifth Flow Record are deleted from the aggregation candidate part B1-2. There may be a case where there are a plurality of Flow Records that agree with the aggregation target in the search of the higher buffer. In this case, all of the plurality of Flow Records are aggregated to the aggregation target.

Figure 14:
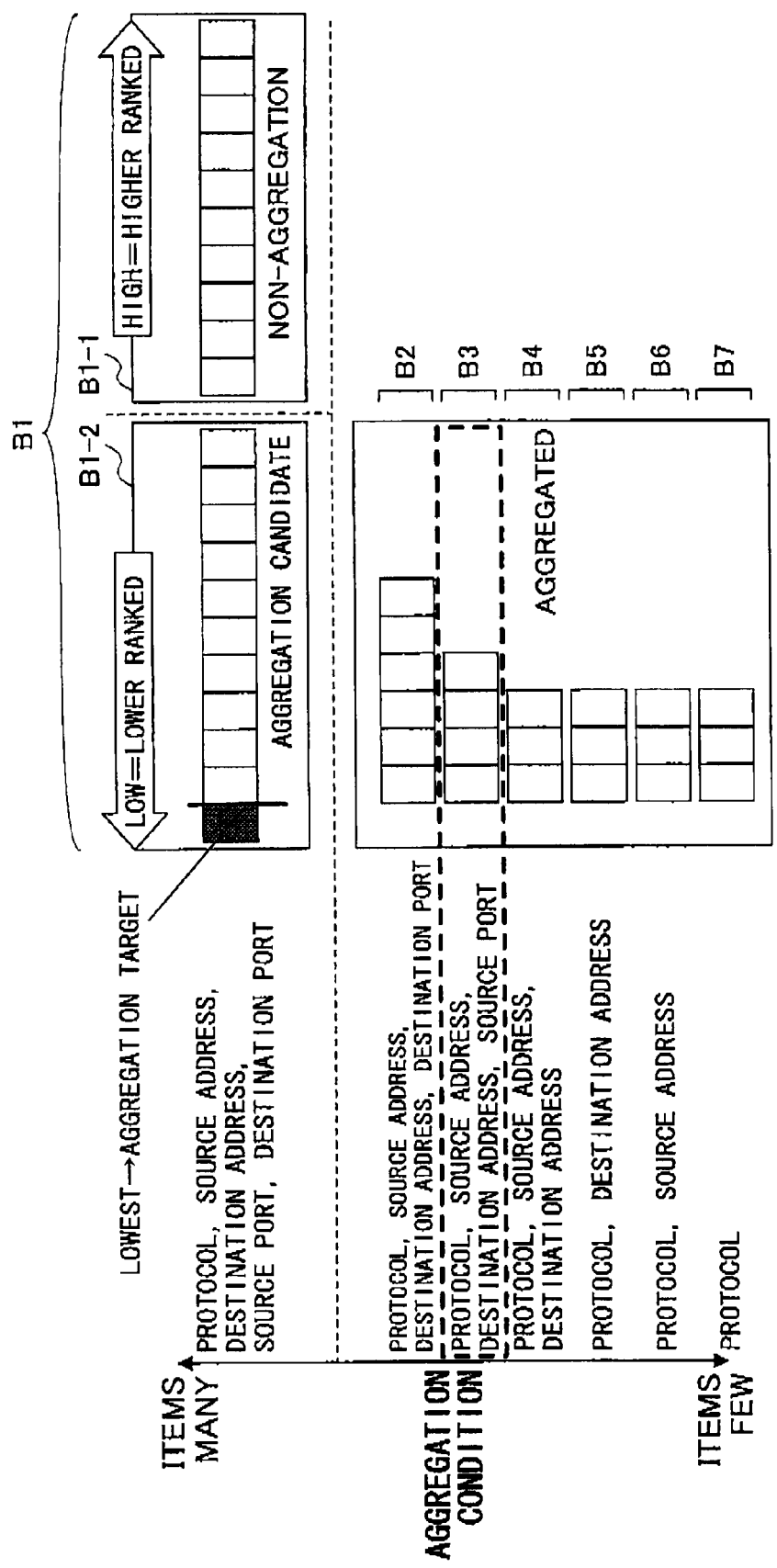
FIG. 14 is a schematic diagram showing another example of aggregation of Flow Records performed by the Flow Record number restriction unit shown in FIG. 2.

When there is no corresponding Flow Record in the determination in step S6, and when the target buffer is determined to be the aggregation candidate part in step S8, it is determined whether the aggregation condition is a condition (the aggregation condition corresponding to the buffer B7) having the smallest number of items for constituting the condition in step S10. When the aggregation condition is not the condition having the smallest number of items, the aggregation condition is changed to a condition having items one less than the current condition in step S11. Then, moving to step S5, a buffer corresponding to the changed aggregation condition is set to be a search target buffer. For example, in a case when the aggregation condition of the buffer B2 is set to be the initial aggregation condition, if there is no aggregated Flow Record that agrees with the aggregation target in items of the aggregation condition in the buffer B2 and there is no aggregated Flow Record that agrees with the aggregation target in items of the aggregation condition also in the aggregation candidate part B1-2, the aggregation condition is changed to an aggregation condition of the buffer B3 that is a condition having items one less than the current condition, and the aggregation target buffer is set to be the buffer B3. Then, the buffer B3 is searched using the changed aggregation condition. FIG. 14 shows a state of search for the buffer B3. In this example, since there is no aggregated Flow Record that agrees with the aggregation target in aggregation condition in the buffer B3, it is determined that there is no corresponding Flow Record in the determination of step S6.

In the loop of steps S6-S9, the target buffer is changed in stages using the aggregation condition set in step S4 or step S11. In addition, in the loop of steps S5-S11, aggregation condition is changed in stages. By gradually changing the target buffer and the aggregation condition, it becomes possible to minimize loss of Flow Records due to aggregation and to hold important information in traffic that is the measurement target.

In addition, according to the aggregation processing, aggregation targets can be aggregated without reducing the number of items of aggregation condition more than necessary, and the number of Flow Records decreases along with aggregation. Although processing is performed while moving through a plurality of buffers in the example of the configuration of the buffers shown in FIG. 3 and FIG. 12-14 and in the example of the algorithm shown in FIG. 11, there is another method for using one buffer by recording ID in each Flow Record in the buffer for indicating and identifying aggregation condition. When all items constituting aggregation condition are different among aggregation conditions, Templates that are transmitted by the flow transmission function unit are basically different, so that Template IDs are different. Therefore, it is only necessary to use a value corresponding to the Template ID as the ID indicating the condition of aggregation. In addition, there are two methods for treating unnecessary Flow Record that was aggregated. One method is to delete the Flow Record from the buffer, and another is to add a special significant ID indicating that the information is invalid in order not to refer to the Flow Record without actually deleting.

As a modified example of the aggregation processing shown in FIG. 11, it is possible to aggregate initial Flow Records between steps S2 and S3. Even when Flow Records agree in values of items used as flow generation and aggregation condition, there may be a case in which a flow in the flows is counted as a separate flow due to end of flow. For example, there are following two conditions.

One is a case for using a connection type protocol such as TCP in which when a message indicating an end (FIN, RST and the like for TCP) is observed, the flow is regarded to end. Another is a case in which timeout period is provided for performing data transmission at predetermined intervals. In this case, a flow exceeding the timeout period terminates once, and is counted as different Flow Record having the same values of items used as flow generation/aggregation condition. As the timeout period, there are two kinds of timeout periods that are a non-continuation period (elapsed time after last packet) for connection less type protocol such as UDP and a continuation period (elapsed time from start packet) for connection type protocol such as TCP. Based on these conditions, there is a possibility that flows are separated as different flows even though items used as the flow generation and aggregation condition are the same between the flows.

For maintaining Flow Records as much as possible without reducing flow aggregation condition more than necessary, there is a case in which processing for deleting aggregation condition becomes unnecessary by aggregating flows that are divided due to the message or the timeout before performing the processing for deleting aggregation condition. In this case, loss of information due to flow aggregation can be kept at a minimum.

In the process steps of gradual change of the aggregation condition in the aggregation processing shown in FIG. 11, when the items of aggregation conditions are exclusive from the beginning, search is not performed for one of the items. For example, the aggregation condition (protocol, source address, destination address and destination port) of the buffer B2 and the aggregation condition (protocol, source address, destination address and source port) of the buffer B3 are the same in the number of items, and are exclusive with each other. Therefore, it is desirable to skip search for the buffer B2 in the search processing in the aggregation condition corresponding to the buffer B3.

The initial aggregation condition set in step 4 is not limited to the four items of protocol, source address, destination address and source port. When performing aggregation for flows divided due to timeout, items of the aggregation condition becomes items constituting a condition (same as the flow generation condition) in which the number of deletions is 0, derived from condition and priority. When aggregation for the flows divided due to timeout is not performed, items of the aggregation condition becomes items constituting a condition in which the number of deletions is 1.

The above-mentioned method is a basic condition reduction method. It can be considered to generate an index for search in order to speed up processing in the condition reduction method. By using the search index, the number of times for search can be decreased.

For generating the search index, a binary tree algorithm can be used, for example. By using a balanced binary tree, it is possible to perform search at a speed of Log 2N. For storing each Flow Record that has information for each of a plurality of items in the binary tree, there are two methods for constructing the binary tree. Generally, a method for constructing the binary tree includes steps of comparing between an element value that has been already stored and an element value to be newly inserted, and determining a storing position based on size relation of them.

The first constructing method is a method for performing size comparison from an item of higher priority among a plurality of items. In this first constructing method, as a result, from an item of higher priority among a plurality of items, values are mapped to higher order digits in order to convert the values to one value, so that size comparison is performed using the converted value.

Figure 15:
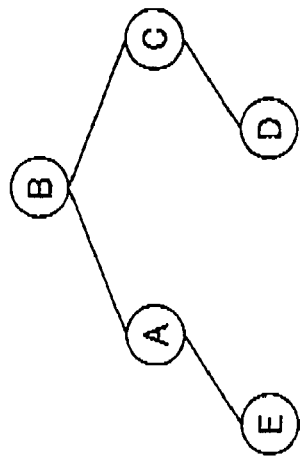
FIG. 15 is a diagram for describing a generation procedure for the search index.

FIG. 15 is a diagram for describing the search index generated by the first constructing method. The example shown in FIG. 15 is provided with five items of protocolIdentifier (priority is 1), destinationTransportPort (priority is 2), sourceIPv4Address (priority is 3), destinationIPv4Address (priority is 4) and sourceTransportPort (priority is 5) as items of each of Flow Records A-E. Among the Flow Records A-E, priorities are not established. Based on these items, the search index is generated based on the following procedure.

First, a flow of A is added to the index. Since "A" becomes the first flow, it is set as a root.

Next, a flow of B is added to the index. Then, sizes of items are compared between A and B in descending order of item priority starting from the item of highest priority. The item of protocolIdentifier of the first priority is the same between flows of A and B, and the item of destinationTransportPort of the second priority is the same between flows of A and B. As to the item of sourceIPv4Address of the third priority, the value "10.0.0.2" of the flow of B is greater than the value "10.0.0.1" of the flow of A. Thus, B is set to be the root instead of A, and A is set as a leaf of the left side.

Next, the flow of C is added to the index. Then, sizes of items are compared between B and C in descending order of item priority starting from the item of highest priority. As to the item of protocolIdentifier of the first priority, a value "17" of the flow of C is greater than the value "6" in the flow of B. Thus, C is set to be a leaf of the right side.

Next, the flow of D is added to the index. Then, sizes of items are compared between B and D in descending order of item priority starting from the item of highest priority. As to the item of protocolIdentifier of the first priority, a value "17" of the flow of D is greater than the value "6" in the flow of B. Thus, D is to be placed in the right side. Since C already exists in the right side, sizes of items are compared between C and D in descending order of item priority starting from the item of highest priority. As to the item of destinationTransportPort of the second priority, the value "192.168.0.1" of the flow of C is greater than the value "10.0.0.1" of the flow of D. Thus, D is set to be a leaf of the left side of C.

Finally, the flow of E is added to the index. Then, sizes of items are compared between B and E in descending order of item priority starting from the item of highest priority. As to the item of protocolIdentifier of the first priority, a value "6" of the flow of B is greater than the value "1" in the flow of E. Thus, E is to be placed in the left side. Since A already exists in the left side, sizes of items are compared between A and E in descending order of item priority starting from the item of highest priority. As to the item of protocolIdentifier of the first priority, the value "6" of the flow of A is greater than the value "1" of the flow of E. Thus, E is set to be a leaf of the left side of A.

Figure 16:
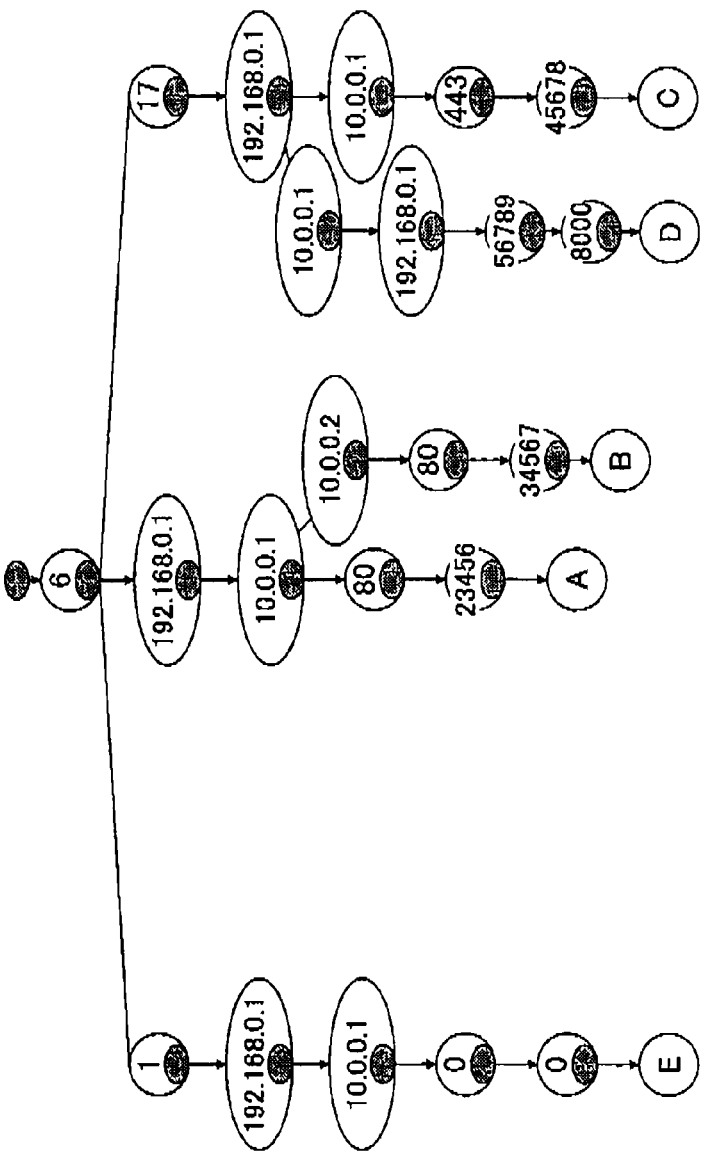
FIG. 16 is a diagram for describing another generation procedure for the search index.

The second constructing method is a method in which generation of a binary tree starts from the highest priority item, and, as to each of items of priority lower than the highest priority, a leaf of an higher priority item is set to be a root of lower priority item. FIG. 16 is a diagram for explaining the search index generated by the second construction method. Also in the example shown in FIG. 16, as the items for the Flow Records A-E, five items having priorities similar to those of the example shown in FIG. 15 are provided, and the search index is generated in the following procedure based on these items.

First, the flow of A is added to the index. An element (value: 6) of protocolIdentifier of the first priority is added as a pointer that is a root of the tree. The pointer of the root of the tree indicates the element. Further, the element has a pointer specifying the second priority. In the same way, the element (value: 192.168.0.1) of destinationTransportPort of the second priority, the element (value: 10.0.0.1) of sourceIPv4Address of the third priority, the element (value: 80) of destinationIPv4Address of the fourth priority and the element (value: 23456) of sourceTransportPort of the fifth priority are added, and an element indicating an element number (value: A) is added under the tree.

Next, the flow of B is added. Since the element (value: 6) of protocolIdentifier of the first priority and the element (value: 192.168.0.1) of destinationTransportPort of the second priority are the same as those of the flow of A, they follow the same tree elements as A. The element (value: 10.0.0.2) of sourceIPv4Address of the third priority is set to be a leaf of the right side of the existing element "10.0.0.1". Each element of priorities after this is added to an element that is set to be a leaf of the right side, and an element indicating an element number (value: B) is added under the tree in the same procedure as that for A.

Next, the flow of C is added. Since the element (value: 17) of protocolIdentifier of the first priority is greater than the existing element (value: 6), it is set to be a leaf of the right side. Each element of priorities after this is added to an element that is set to be a leaf of the right side, and an element indicating an element number (value: C) is added under the tree in the same procedure as that for A.

Next, the flow of D is added. Since the element (value: 17) of protocolIdentifier of the first priority is the same as that of the flow of C, they follow the same tree elements as C. Since the element (value: 10.0.0.1) of destinationTransportPort of the second priority is smaller than the existing element (value: 192.168.0.1), it is set to be a leaf of the left side. Each element of priorities after this is added to an element that is set to be a leaf of the left side, and an element indicating an element number (value: D) is added under the tree in the same procedure as that for A.

Finally, the flow of E is added. Since the element (value: 1) of protocolIdentifier of the first priority is smaller than the existing element (value: 6), it is set to be a leaf of the left side. Each element of priorities after this is added to an element that is set to be a leaf of the left side, and an element indicating an element number (value: E) is added under the tree in the same procedure as that for A.

There are following characteristics in the first and second construction methods.

According to the first construction method, the tree structure is simple, the tree does not become deep, and a balance (balanced tree) can be generated. However, when generating a new condition by deleting an item constituting a condition, it is necessary to generate the tree structure again.

On the other hand, according to the second construction method, although the tree becomes deep, once the tree structure is generated, a part of leafs can be aggregated even though a condition is reduced unless there are overlapping priorities. Thus, it is not necessary to regenerate the tree structure again. In addition, for example, it is possible to change handling method of information for each item, for example, it is possible to exclude a particular port. However, the second construction method cannot be applied when priorities overlap.

By generating and holding the index based on the first or the second construction method and by performing reduction of condition by referring to the index when generating and aggregating Flow Records, it becomes possible to improve efficiency of generation and aggregation processing.

More particularly, for Flow Records stored in the management buffer, the flow generation function unit determines size relation among the Flow Records by repeating size comparison for each item held by the Flow Records based on priorities of the items input from the outside, and holds the result as the search index so as to generate Flow Records by referring to the search index. Accordingly, the number of times for comparing conditions (each being a combination of items) for generating Flow Records can be reduced. As a result, efficiency of processing can be improved.

In addition, for Flow Records stored in the management buffer, the Flow Record number restriction function unit determines size relation among the Flow Records by repeating size comparison for each item held by the Flow Records based on priorities of the items input from the outside, and holds the result as the search index so as to aggregate Flow Records by referring to the search index. Accordingly, the number of times for comparing conditions (each being a combination of items) for aggregating Flow Records can be reduced. As a result, efficiency of processing can be improved.

In the first construction method, as a method for suppressing decrease of efficiency at a minimum when regenerating the tree structure for each condition, there is a method for having the number of aggregate candidates of a past same condition and having the number of held Flow Records for each condition.

In this method, the Flow Record number restriction function unit recodes the number of aggregation candidates and the number of aggregation results which are calculated using the upper limit value and the nor-aggregation number that are already held, and records histories of the number of flows for each item of the aggregation condition when performing Flow Record restriction. When performing aggregation after next time, the Flow Record number restriction function unit estimates the number of initial items used for generating the search index based on the recorded information so as to reduce the number of times for generating the search index.

The upper limit value is a number (provided from the outside, or determined internally based on the capacity of the management buffer) of Flow Records to be finally provided to the flow transmission function unit by the Flow Record number restriction function unit. The non-aggregation number is a number (provided from the outside) of Flow Records, which are not aggregated, located at higher positions after sorting. The number of aggregation candidates is a value obtained by subtracting the non-aggregation number from the total number of Flow Records generated by the flow generation function unit. The number of aggregation results is a value of results of aggregation, that is, it is a value obtained by subtracting the non-aggregation number from the upper limit value.

In the following, processing for estimating the number of initial items by the Flow Record number restriction function unit is described concretely.

For each time, the Flow Record number restriction function unit holds the number of aggregation candidates that is obtained by subtracting the non-aggregation number from the total number of the generated Flow Records, the number of aggregation results obtained by subtracting the non-aggregation number from the upper limit value, the number of Flow Records for each item of information (Information Element) in the condition (Flow Key) used for aggregation. FIG. 17 shows an example of information held by the Flow Record number restriction function unit. In the example shown in FIG. 17, information of past five times are recorded for the number of aggregation candidates, the number of aggregation results, and each item such as protocolIdentifier (priority is 1), destinationTransportPort (priority is 2), sourceIPv4Address (priority is 3), destinationIPv4Address (priority is 4), and sourceTransportPort (priority is 5).

For example, referring to the most recently recorded information, the number of aggregation candidates is 120034, and the number of aggregation results is 20000. As a breakdown of the number of aggregation results, the number of flows of the results aggregated by using only protocolIdentifier (condition of number of deletions: 4 in FIG. 6) is 4 in which protocolIdentifier is an aggregation condition including the item of the first priority, the number of flows of the results aggregated by using an aggregation condition (condition of number of deletions: 3 in FIG. 6) including items up to the second priority is 6442, the number of flows of the results aggregated by using an aggregation condition (condition of number of deletions: 2 in FIG. 6) including items up to the third priority is 12321, and the number of flows of the results aggregated by using an aggregation condition (condition of number of deletions: 1 in FIG. 6) including items up to the fourth priority is 1233, and the number of flows of the results aggregated by using an aggregation condition (condition of number of deletions: 0 in FIG. 6) including items up to the fifth priority is 0.

The aggregation in which the number of flow is 0 is regarded as unnecessary aggregation as a result. That is, in the first most recent aggregation, a condition including items up to the fifth priority is omitted, and generation of the index is started from the condition including items up to the fourth priority. Accordingly, the number of times of processing is reduced so that processing speed increases.

The Flow Record number restriction function unit determines a case in which aggregation can be omitted based on past records. In the example shown in FIG. 17, in the first most recent information, third most recent information and fifth most recent information, the number of flows is 0 when using a condition including items up to the fifth priority. The numbers of aggregation candidates are 120034, 93898, and 108270 respectively for the first, third and fifth aggregation. By referring to the information, when the number of aggregation results is 20000 and when the number of Flow Records that are aggregation targets is equal to or greater than 93898 that is a minimum value in a state in which omission is available, it can be estimated that the index can be made from the condition including items up to the fourth priority (that is, a combination of items of protocolIdentifier, protocolIdentifier, destinationTransportPort, and destinationIPv4Address). In this case, since it becomes unnecessary to generate the index based on a condition including items up to the fifth priority, processing speed of the whole system can be increased.

Figure 18:
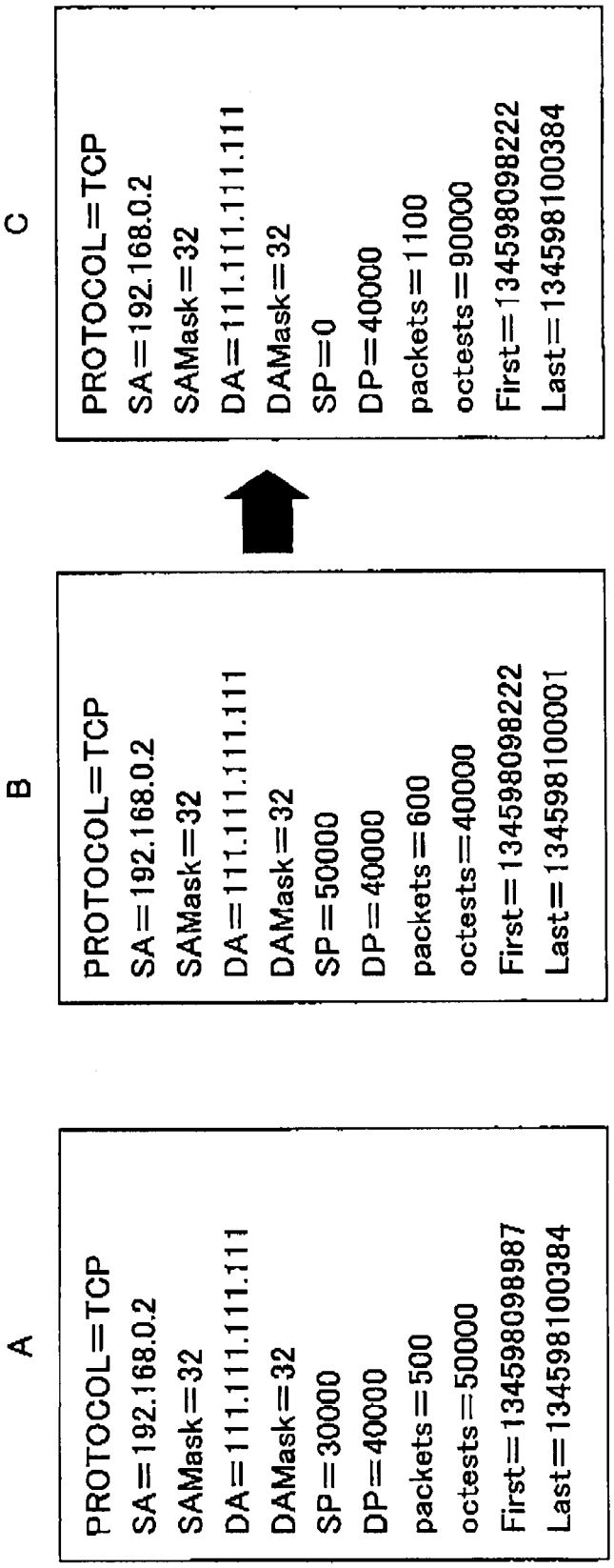
FIG. 18 is a schematic diagram showing an example for aggregating ports.

In the following, examples of aggregation are described. FIG. 18 shows an example for aggregating ports. In FIG. 18, each of A and B is a Flow Record that is generated by a condition (flow generation condition) of five items of protocol, source address, destination address, source port and destination port. C is aggregated a Flow Record obtained by aggregating Flow Records A and B using items of the flow generation condition as an aggregation condition. In this example, source port is deleted from items constituting the aggregation condition. "SA" indicates source address, "DA" indicates destination address, "SAMask" and "DAMask" are netmasks, "SP" indicates source port, "DP" indicates destination port, "Packets" indicates the number of packets, "octets" indicates the number of bytes, "First" is a start time of flow, and "Last" is an end time of flow.

In the aggregated Flow Record C, the value of source port "SP" is set to be "0", and the number of packets "Packets" and the number of bytes "octets" are set to be values obtained by adding corresponding values of Flow Records A and B, respectively. In addition, each of the start time "First" and the end time "Last" is set to be in a range of union of times corresponding to the Flow Records A and B. In this example, a start time "First" and an end time "Last" of the Flow Record A are set to be "134598098987" and "134598100384" respectively, and a start time "First" and an end time "Last" of the Flow Record B are set to be "134598098222" and "134598100001" respectively. Thus, a start time "First" and an end time "Last" of the Flow Record C are set to be "134598098222" and "134598100384" respectively. Accordingly, for the Flow Records A and B, the aggregated Flow Record C can be obtained by aggregating the source port "SP", the number of packets "Packets", the start time "First", and the end time "Last". In this example, since source ports are not common, source port is set to be 0 in the aggregated Flow Record C. However, when aggregating a plurality of flows, it is possible to use, as a representative value, a value of a flow aggregation item by which an arbitrary amount in monitoring items such as data amount is the largest in Flow Records. In the example of source port, a source port number where the data amount is the greatest may be set. In addition, information of a head packet of a flow may be used as a representative value, and information indicating that aggregation has been performed may be added. Two schemes can be applied when deleting an item of aggregation condition. One scheme is to delete the item forming corresponding field information from the Template, and another scheme is to delete the item from the Flow Key without deleting the item from the Template. As to the former scheme, since the deleted item is not transmitted, any value may be set internally. In the latter case, a representative value of the deleted item is transmitted. According to the specification of IPFIX protocol, it is recommended to use a value observed first for an item that is not used as the Flow Key.

Figure 19:
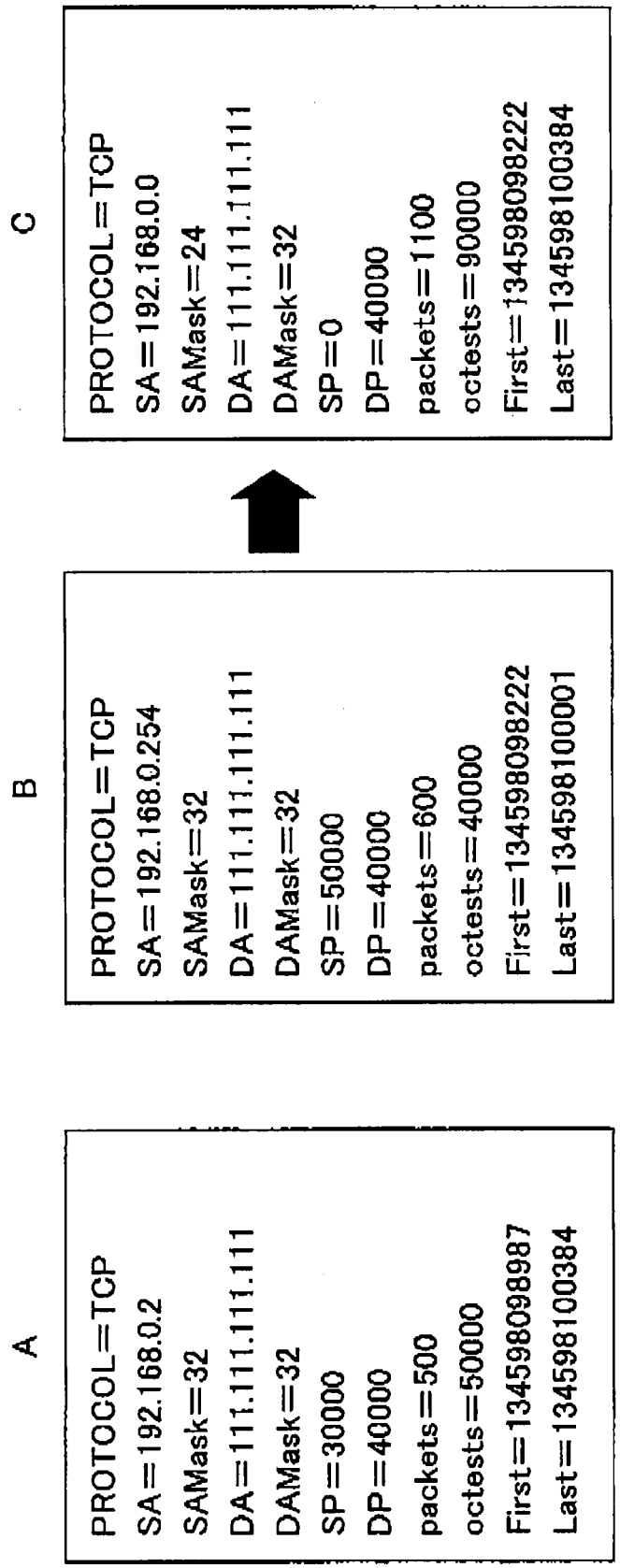
FIG. 19 is a schematic diagram showing an example for aggregating addresses.

FIG. 19 shows an example for aggregating addresses. In FIG. 19, each of A and B is a Flow Record that is generated based on a condition (flow generation condition) of five items of protocol, source address, destination address, source port and destination port. C is an aggregated Flow Record obtained by aggregating the Flow Records A and B using three items of protocol, source address and destination address in the flow generation condition as an aggregation condition.

Like the case shown in FIG. 18, in the aggregated Flow Record C, the value of source port "SP" is set to be "0", each of the number of packets "Packets" and the number of bytes "octets" is one obtained by adding corresponding values of Flow Records A and B, and each of the start time "First" and the end time "Last" is set to be in a range of union of corresponding times of the Flow Records and B. Each address is set to be a new value obtained as a product set of values of corresponding address of the Flow Records A and B. In this example, a new destination address "192.168.0.0" is obtained as a product set of the destination address "192.168.0.2" of the Flow Record A and the destination address "192.168.0.254" of the Flow Record B. In accordance with the change of the address value, the netmask "SAMask" is also changed to "24". When the scheme of deleting item from the Template is adopted, since information on the item deleted from items forming the aggregation condition is not transmitted, any value can be internally held like the above-mentioned case. In the scheme of excluding the item from the Flow Key, under the environment of IPv4 which is an example, when SAMask is other than 32 bits, it is necessary to change the item to be transmitted to the item (sourceIPv4Prefix) indicating a prefix instead of the item (sourceIPv4Address) indicating an address. If it is not changed to the prefix, a representative value should be used, thus, a representative value before calculating the product set (it is desirable to use a value of a head packet according to the protocol specification as mentioned above) is used. In addition, in this case, "32" indicating a host address is used for SAMask.

By the way, in the present scheme, when restricting the number of Flow Records to a number equal to or less than a predetermined number, the total number of possible values of items forming the aggregation condition in a state in which the number of deletions is largest becomes a minimum value as the upper limit value for ensuring that the number can be restricted to be equal to or less than a predetermined number.

As flows increase due to attack traffic, the number of Flow Records that are generated by the flow generation function unit increases. According to the above-mentioned invention, when the number of Flow Records input from the flow generation function unit increases, the Flow Record number restriction function unit aggregates a part (aggregation candidates) of the stored Flow Records. By this aggregation of Flow Records, the number of Flow Records provided to the flow transmission function unit per a predetermined time can be restricted to be equal to or less than a predetermined number. Therefore, the number of Flow Records that the flow transmission function unit transmits over the measurement network per a predetermined time is also limited to equal to or less than a predetermined number. Accordingly, irrespective of increase of flows, only Flow Records equal to or less than a predetermined number are transmitted over the measurement network. Thus, it becomes possible to suppress congestion of communication on the measurement network, which congestion occurs when using UDP having no congestion control function as a transport protocol.

In addition, Flow Records that include important information in measurement of traffic are excluded from targets of aggregation, and unimportant Flow Records are aggregated. Thus, Flow Records that characterize traffic in a measurement purpose are maintained.

Further, since comparison items included in the condition for aggregation are changed gradually, it can be avoided that aggregation is performed using a condition having few items more than necessary, so that loss of information in aggregated Flow Records can be kept at a minimum.

In addition, since only Flow Records the number of which is equal to or less than a predetermined number are provided to the flow transmission function unit, the internal buffer in the flow transmission function unit does not overflow so that Flow Records are not lost. Therefore, the problem that occurs if TCP or SCTP having congestion control function is used as a transport protocol does not occur, wherein the problem is that, information of the whole observed traffic cannot be correctly transmitted due to loss of Flow Records caused by overflow of the internal buffer in the flow transmission function unit. Accordingly, the loss of Flow Records due to overflow of internal buffer in the flow transmission function unit, which occurs if TCP or SCTP having congestion control function is used as a transport protocol, can be suppressed. Thus, information of the whole observed traffic can be transmitted to the measurement terminal correctly.

The Flow Record restriction apparatus (node) of the present embodiment described above is an example of the present invention, and variations and modifications may be made for the configuration and the operation without departing from the scope of the present invention.

The processing of each of the flow generation function unit, the Flow Record number restriction function unit and the flow transmission function unit can be realized by executing a program stored in a storage apparatus by a control apparatus that forms a computer system. The program may be provided via a disk type recording medium such as a CD-ROM and a DVD, and the program may be provided by downloading via the Internet.

Although five items of protocol, source IP address, destination IP address, source port and destination port are taken as examples of items of the flow generation condition and the aggregation condition, the present invention is not limited to these. Items for the flow generation condition and the aggregation condition may include items other than these or may include none of these items as long as each of the items include information based on header information. The information based on header information includes information determined from header information, even when it is not included in a header itself. As an example, routing information is included in the information based on the header information. In addition, the header information is not limited to the network layer and the transport layer, and includes protocols upper and lower of these. In addition, the number of items of the flow generation condition and the aggregation condition can be properly set within a range in which generation and aggregation of flows are available.

The present international application claims priority based on Japanese patent application No. 2006-314299, filed in the JPO on Nov. 21, 2006 and Japanese patent application No. 2007-199499, filed in the JPO on Jul. 31, 2007, the entire contents of the Japanese patent applications No. 2006-314299 and No. 2007-199499 are incorporated herein by reference.

The invention claimed is:

1. A flow record restriction apparatus that is placed in a network interconnecting a plurality of terminals and that is connected to a measurement terminal for measuring traffic in the network via a measurement network, comprising:
    a flow record generation unit configured to determine a set of packets having the same attribute to be a flow of the same communication, and to generate a flow record based on header information of the packets for each flow;
    a flow record number restriction unit including a management buffer for temporarily storing flow records generated by the flow record generation unit, the flow record number restriction unit being configured to read the flow records from the management buffer and output the flow records;
    a plurality of search target buffers; and
    a flow record transmission unit configured to packetize the flow records output from the flow record number restriction unit to transmit packets over the measurement network,
    wherein, when a number of flow records stored in the management buffer exceeds a preset upper limit value, the flow record number restriction unit divides the stored flow records into non-aggregation flow records and aggregation candidates having lower importance in measurement of traffic than the non-aggregation flow records, aggregates flow records determined to be the aggregation candidates, and performs control such that a number of flow records stored in the management buffer becomes equal to or less than a predetermined number,
    wherein each of the search target buffers is configured to store aggregated flow records, each of which is obtained by aggregating flow records which satisfy an aggregation condition, the aggregation condition comprising a predetermined number of items less than the number of items of the flow generation condition, and
    wherein the flow record number restriction unit is configured to aggregate an aggregation target in the aggregation candidates by comparing the aggregation target with the aggregated flow record in one of the search target buffers corresponding to an aggregation condition while changing the aggregation condition.

2. The flow record restriction apparatus as claimed in claim 1,
    wherein each flow record includes measurement information necessary for measurement of the traffic,
    the flow record number restriction unit ranks and sorts flow records stored in the management buffer based on size relation in an amount or a statistical value of the measurement information, determines higher-ranked flow records of the sorted flow records to be the non-aggregation flow records, and determines lower-ranked flow records to be the aggregation candidates.

3. The flow record restriction apparatus as claimed in claim 1 or 2, wherein the flow record number restriction unit changes comparison items included in a condition for aggregating the flow records in stages.

4. The flow record restriction apparatus as claimed in claim 3, wherein the flow record number restriction unit holds items corresponding to packet attributes used for generation of flow records by the flow record generation unit and holds priorities, of the items, input from the outside, and changes the comparison item in stages by repeating processing for deleting a lowest priority item from items for generating the flow records.

5. The flow record restriction apparatus as claimed in claim 1, wherein the flow record generation unit determines size relation among flow records stored in the management buffer by repeating size comparison for each item included in the flow records based on priorities of items input from the outside, holds the determination result as a search index so as to generate flow records by referring to the search index.

6. The flow record restriction apparatus as claimed in claim 1, wherein the flow record number restriction unit determines size relation among flow records stored in the management buffer by repeating size comparison for each item included in the flow records based on priorities of items input from the outside, holds the determination result as a search index so as to aggregate flow records by referring to the search index.

7. The flow record restriction apparatus as claimed in claim 6, wherein the flow record number restriction unit records history of information that includes a number of aggregation candidates obtained by subtracting a non-aggregation number which is a number of non-aggregation flow records which are higher-ranked after sorting from a total number of flow records generated by the flow record generation unit, a number of aggregation results obtained by subtracting the non-aggregation number from the upper limit value, and a number of flows for each item of aggregation condition for flow record restriction, so that the flow record number restriction unit estimates a number of initial items used for generation of the search index for performing next aggregation.

8. The flow record restriction apparatus as claimed in any one of claims 5-7, wherein the search index has a binary tree data structure in which a leaf of an item of higher priority is set to be a root of an item of a lower priority.

9. The flow record restriction apparatus as claimed in claim 3, wherein the flow record generation unit determines, as a flow, a set of packets that agrees in each item of protocol, source address, destination address, source port, and destination port that forms the header information and that are used in the communication, and generates a flow record including information on each item as information of the flow, and the flow record number restriction unit aggregates flow records that are determined to be the aggregation candidates by changing the aggregation condition in a range of a plurality of aggregation conditions, formed by combinations of items, having different comparison items.

10. A flow record restriction method performed in a communication apparatus that is placed in a network interconnecting a plurality of terminals and that is connected to a measurement terminal for measuring traffic in the network via a measurement network, comprising:

a first step of determining a set of packets having the same attribute to be a flow of the same communication, and generating a flow record based on header information of the packets for each flow;

a second step of temporarily storing flow records generated in the first step in a management buffer, reading the flow records from the management buffer; and a third step of packetizing the flow records output in the second step and transmitting packets over the measurement network, wherein, the second step includes a step of, when a number of flow records stored in the management buffer exceeds a preset upper limit value, dividing the stored flow records into non-aggregation flow records and aggregation candidates having lower importance in measurement of traffic than the non-aggregation flow records, aggregating flow records determined to be the aggregation candidates, and performing control such that a number of flow records stored in the management buffer becomes equal to or less than a predetermined number, wherein the communication apparatus includes a plurality of search target buffers and each of the search target buffers stores aggregated flow records, each of which is obtained by aggregating flow records which satisfy an aggregation condition, the aggregation condition comprising a predetermined number of items less than the number of items of the flow generation condition, and wherein the method includes aggregating an aggregation target in the aggregation candidates by comparing the aggregation target with the aggregated flow record in one of the search target buffers corresponding to an aggregation condition while changing the aggregation condition.

* * * * *